(12) United States Patent
Cooper et al.

(10) Patent No.: US 6,662,341 B1
(45) Date of Patent: Dec. 9, 2003

(54) METHOD AND APPARATUS FOR WRITING A WINDOWS APPLICATION IN HTML

(75) Inventors: Phillip R. Cooper, North Bend, WA (US); Loren M. Kohnfelder, Bellevue, WA (US); Roderick A. Chavez, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/315,858

(22) Filed: May 20, 1999

(51) Int. Cl.[7] .............................................. G06F 17/21
(52) U.S. Cl. ................................... 715/513; 715/501.1
(58) Field of Search ............................... 707/513, 501.1; 709/230, 310–311, 320, 328–329; 717/106, 110, 112, 114–119; 715/513, 501.1

(56) References Cited

U.S. PATENT DOCUMENTS

| | | | | |
|---|---|---|---|---|
| 5,892,908 A | * | 4/1999 | Hughes et al. | 707/100 |
| 5,995,756 A | * | 11/1999 | Herrmann | 717/178 |
| 6,125,352 A | * | 9/2000 | Franklin et al. | 705/26 |
| 6,178,426 B1 | * | 1/2001 | Klein et al. | 707/102 |
| 6,195,694 B1 | * | 2/2001 | Chen et al. | 709/203 |
| 6,212,535 B1 | * | 4/2001 | Weikart et al. | 707/513 |
| 6,263,344 B1 | * | 7/2001 | Wu et al. | 707/104.1 |
| 6,266,681 B1 | * | 7/2001 | Guthrie | 707/10 |
| 6,317,759 B1 | * | 11/2001 | Osmond | 707/513 |
| 6,370,552 B1 | * | 4/2002 | Bloomfield | 345/759 |

OTHER PUBLICATIONS http://www.meadroid.com/docs/wpm/overview.htm, "MeadCo's WPM 5.0 Programming Manual," available at least as early as Jun. 1999.
http://www.meadroid.com/docs/wpm/refs.htm, "MeadCo WPM 5.0 Programming Reference," available at least as early as Jun. 1999.

* cited by examiner

Primary Examiner—Stephen S. Hong
(74) Attorney, Agent, or Firm—Christensen O'Connor Johnson Kindness PLLC

(57) ABSTRACT

A method, apparatus, and computer-readable medium for authoring and executing HTML application files is disclosed. An HTML application file is basically a standard HTML file that runs in its own window outside of the browser, and is thus not bound by the security restrictions of the browser. The author of an HTML application file can take advantage of the relaxed security. The author of the HTML application file designates the file as an HTML application file by doing one or more of the following: defining the MIME type as an HTML application MIME type; or using an HTML application file extension for the file. When a browser, such as the Internet Explorer, encounters one of the above, it processes the file as an HTML application file rather than a standard HTML file by creating a main window independent of the browser, and rendering the HTML in the main window.

9 Claims, 22 Drawing Sheets

```
<HTA:APPLICATION ID=myapp
    applicationName=name
    version=string
    icon=imageURL
    singleInstance=yes | no
    showInTaskBar=yes | no
    minimizeButton=yes | no
    maximizeButton=yes | no
    border=none | thin | dialog | thick
    borderStyle=Normal | Raised | Sunken | complex | Static
    sysMenu = yes | no
    windowState=Normal | Maximize | Minimize
    caption=yes | no
>
```

*Fig.6.*

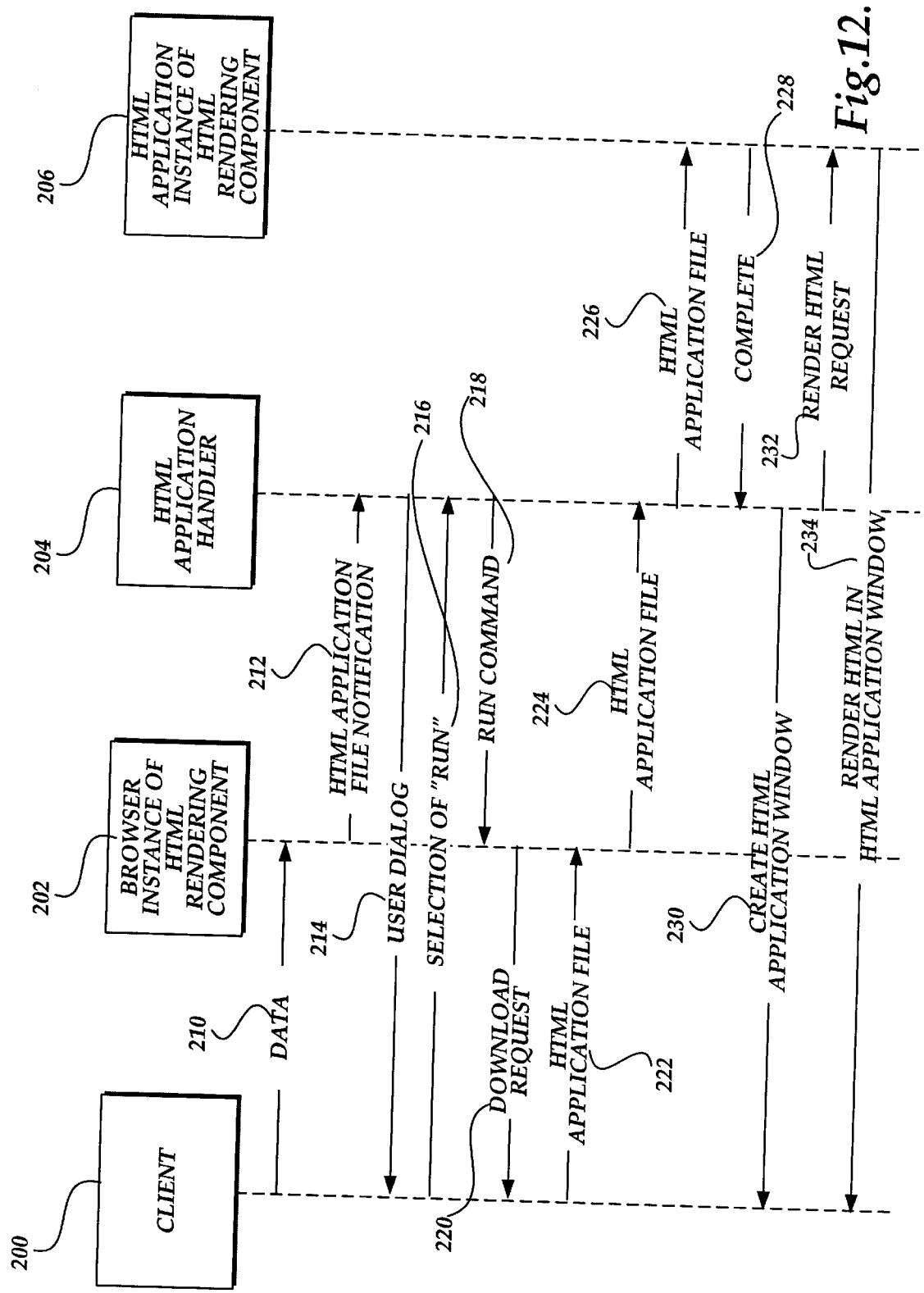

METHOD AND APPARATUS FOR WRITING A WINDOWS APPLICATION IN HTML

FIELD OF THE INVENTION

This invention relates generally to writing computer applications, and more particularly to writing a Windows application using HTML.

BACKGROUND OF THE INVENTION

Most existing Windows application development environments require knowledge of specialized computer languages such as C++, or Visual Basic. Learning a specialized computer language is often difficult for non-technical individuals. However, many non-technical individuals can use HTML (HyperText Markup Language) and scripting languages, such as VBScript and JScript. HTML and scripting languages are run inside of a Web browser, and thus, inherit the browser's user interface and security mechanisms. Because non-technical individuals have knowledge of HTML and scripting languages, it would be advantageous to leverage such existing knowledge to implement a Window's application. Such applications should be free to define their own user interface elements and to run as trusted code on the system, i.e., outside of the security model imposed by the Web browser. The present invention is directed to achieving this result.

SUMMARY OF THE INVENTION

The present invention is directed to a method, system, and computer-readable medium for creating and executing HTML applications.

In accordance with the present invention, creating an HTML application file is done by an HTML author by creating a standard HTML file and then designating the file as an HTML application file.

In accordance with other aspects of the present invention identifying the file as an HTML application file can be accomplished by naming the file using an HTML application file extension. Alternatively, designating the file as an application file can be accomplished by specifying the MIME type as an HTML application MIME type.

In accordance with yet other aspects of the present invention, an HTML application can be run locally or remotely.

In accordance with further aspects of the present invention, running an HTML application is accomplished by determining whether the requested file is an HTML application file. If the HTML file is an application file, a determination is made as to whether the file should be run. If so, an HTML application window is opened, and the HTML is parsed and rendered in the HTML application window.

In accordance with still further aspects of the present invention, the determination of whether a file is an HTML file is made based on whether one or more of the following are true: (1) the file is named using an HTML application file extension; and (2) the MIME type is an HTML application MIME type.

In accordance with yet other aspects of the present invention, determining whether the HTML application file should be run is determined by a user via a suitable user interface.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 illustrates an HTML application tag and its attributes;

FIG. 12 is a message sequence diagram illustrating communications used in executing an HTML application file using Microsoft Internet Explorer 5.0 in accordance with the present invention.

DETAILED DESCRIPTION OF THE PREFERRED EMBODIMENT

Figure 1:
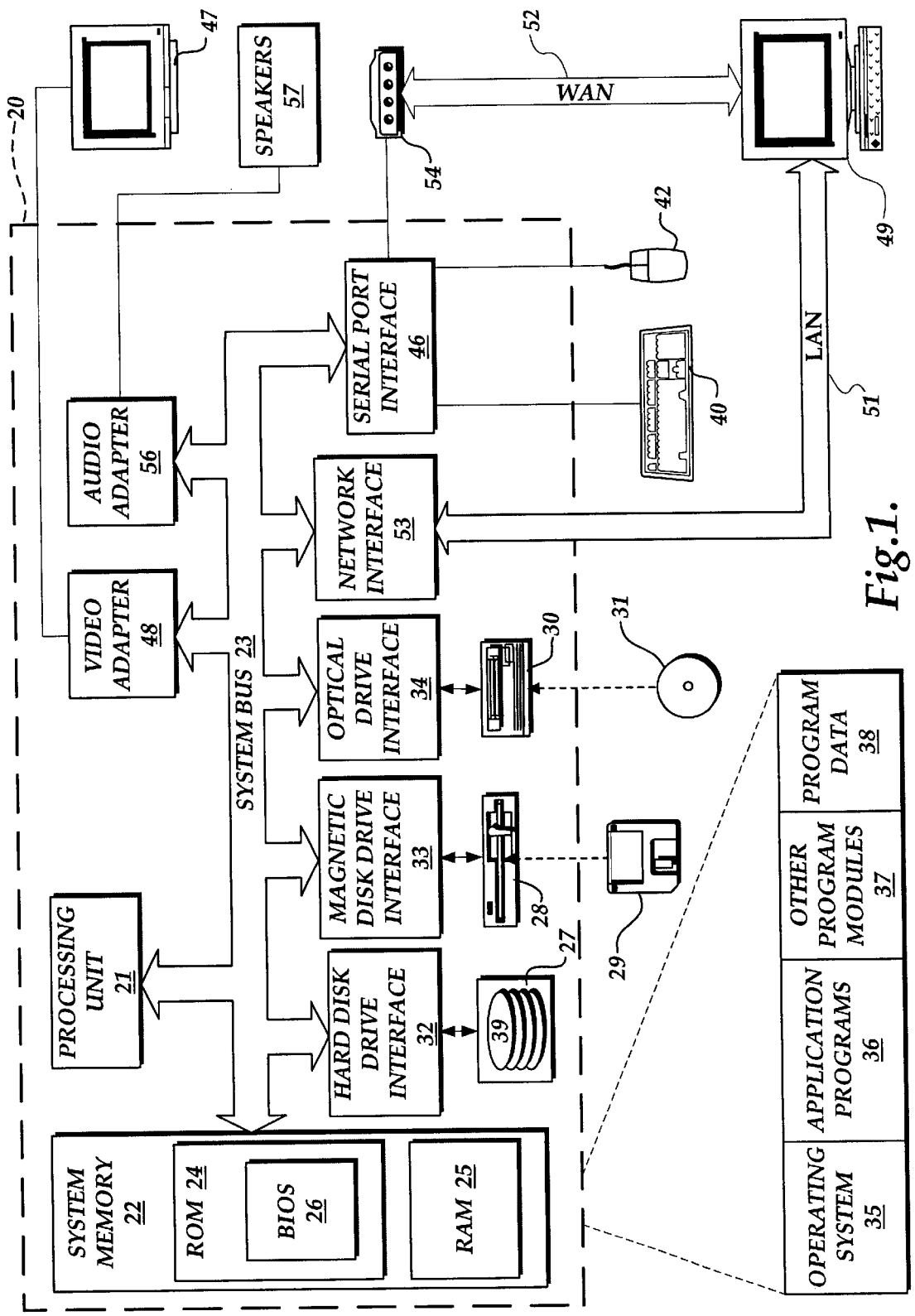
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems,. microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which. may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

While this invention can be implemented on various computer architectures using any Web browser, the preferred embodiment illustrated and described is implemented using Microsoft Internet Explorer 5.0 (or a subsequent version of Microsoft Internet Explorer). Internet Explorer uses security zones to enable users to safely browse the Web. There are four security zones defined in Internet Explorer: (1) Internet; (2) Intranet; (3) Trusted; and (4) Restricted. Each zone has an associated security level: high (most secure, excludes potentially damaging content); medium (warns before running potentially damaging content); low (does not warn before running potentially damaging content); and custom (based on settings selected by the user). Default settings set non-trusted zones at a high security level. Although the settings can be lowered, warnings are displayed recommending that the security level not be lowered.

Standard HTML files are bound by the security restrictions imposed by the browser. In contrast, HTML applications are not restricted by security zones. This relaxed security allows an HTML author to do things such as: read from a user's local computer; write to a user's local computer; perform scripting of frames between domains. However, the HTML application author can specify an application attribute to enable/disable security for an individual frame or iframe (inline floating frame)element. In other words, the HTML application author determines whether the application should run as trusted.

FIGS. 2A–5E illustrate examples of HTML files "run" as standard HTML files and as HTML application files. FIGS. 2A–2B and FIGS. 3A–3B illustrate a simple example of a file rendered as a standard HTML file (FIGS. 2A–2B) and as an HTML application file (FIGS. 3A–3B). The file used for the examples illustrated in FIGS. 2A–2B and FIGS. 3A–3B is included as Appendix A. This file is a simple example and is included to illustrate the fact that HTML application files run in a window outside of the Web browser.

An instance of a browser, such as Microsoft Internet Explorer, is created, i.e., run. The browser user interface 60 is displayed on a user's display 47. The user then selects the HTML file to be rendered. This can happen in different ways, for example via a hyperlink of a displayed page or by opening an HTML file, such as via an open dialog (such as 61 in FIG. 2A) invoked by selecting an open option on the browser user interface 60, such as via an open menu item. FIG. 2B illustrates the display resulting from the open dialog 61 of FIG. 2A. The HTML file, "C:\HTML\simple.htm" as indicated in the browser address field 63 is rendered in the browser display window 62 as shown in FIG. 2B. Referring to Appendix A, "<HTA:APPLICATION ICON= simple.ico>" is ignored when the file is processed as a standard HTML file, such as in FIG. 2B. However, when the file is rendered as an HTML application file, this line is significant, as shown in FIG. 3B and described below.

Figure 2A:
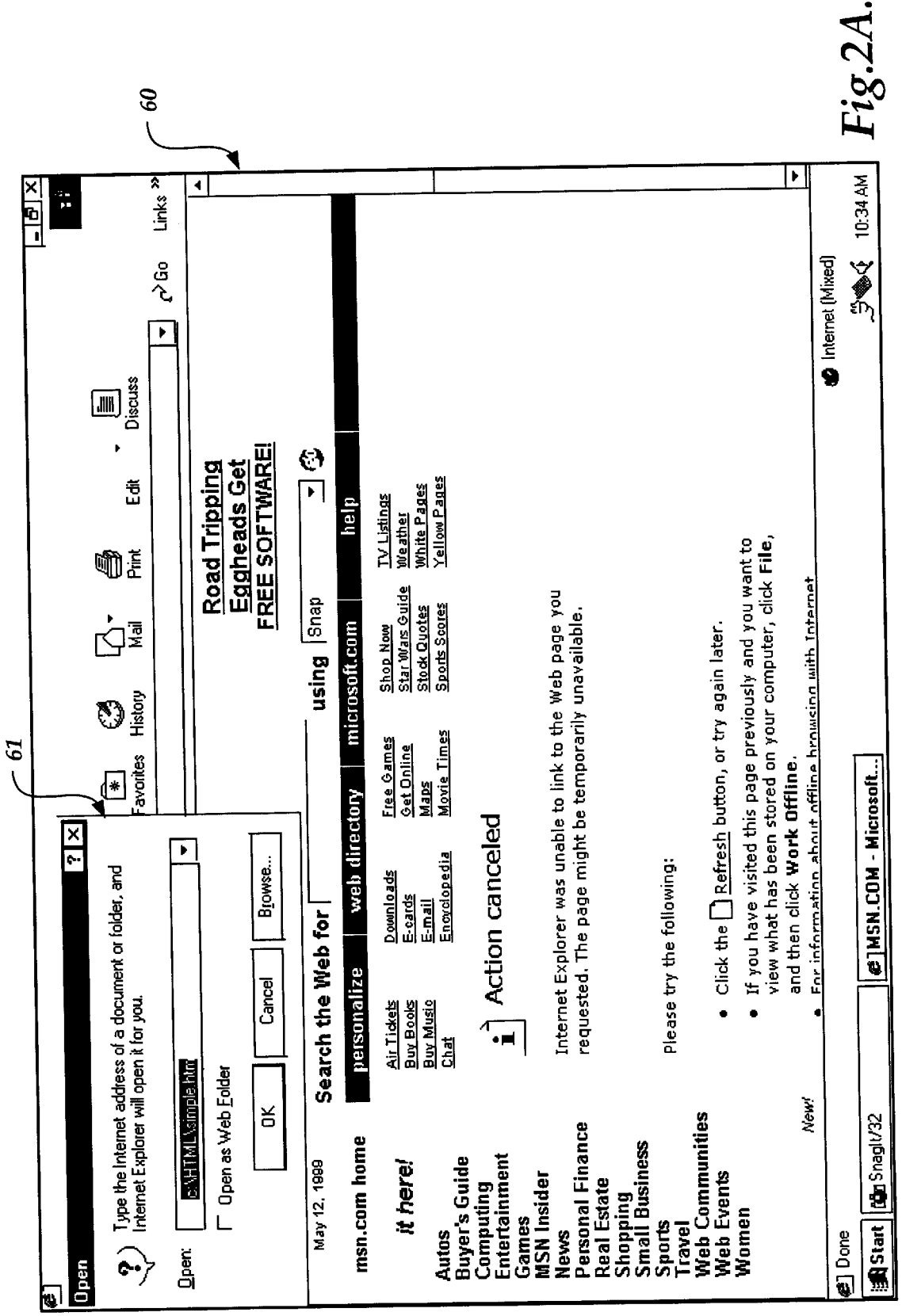
FIGS. 2A–2B are exemplary screen shots illustrating rendering of a standard HTML file.
Figure 2B:
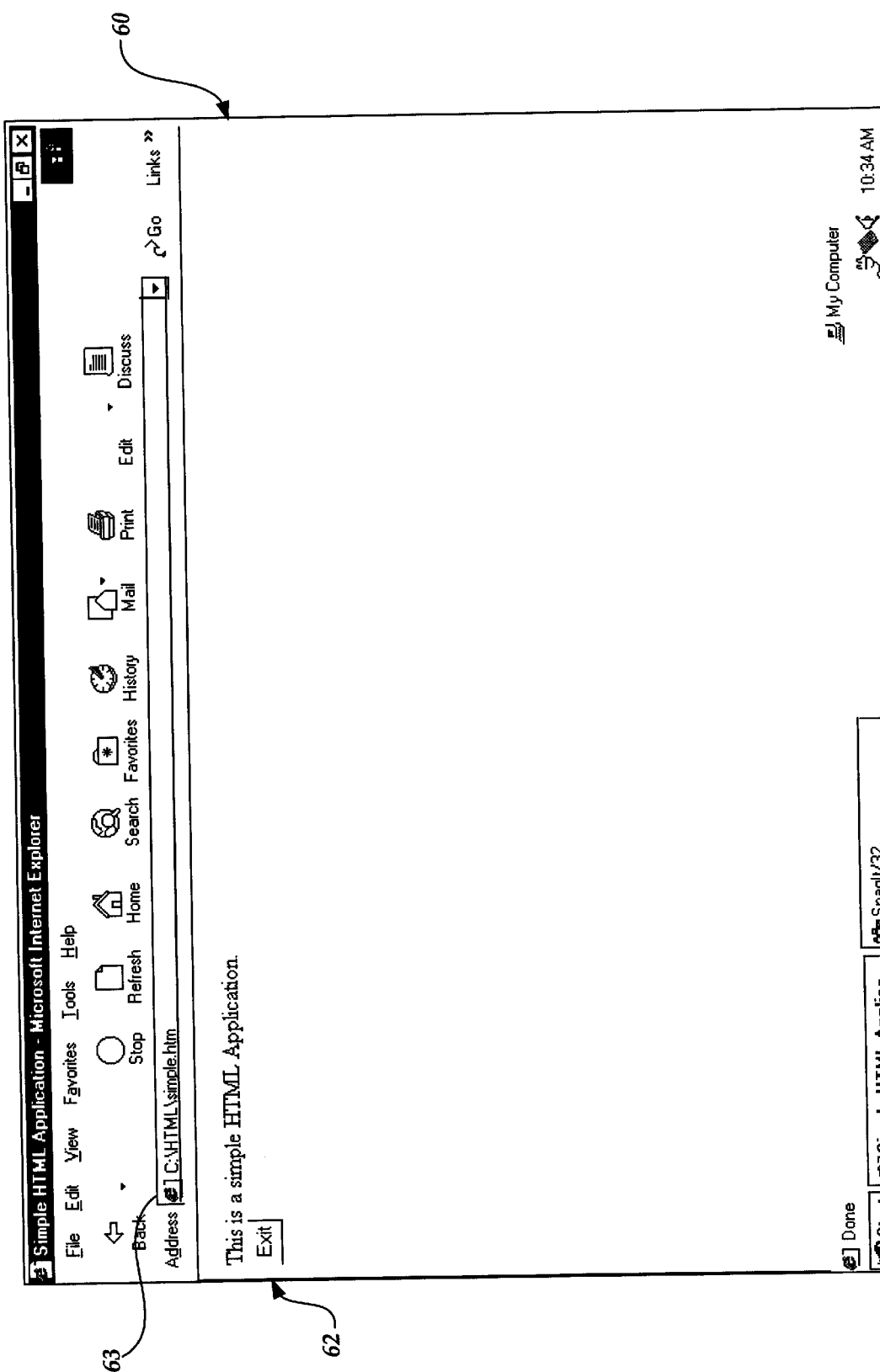
Figure 3A:
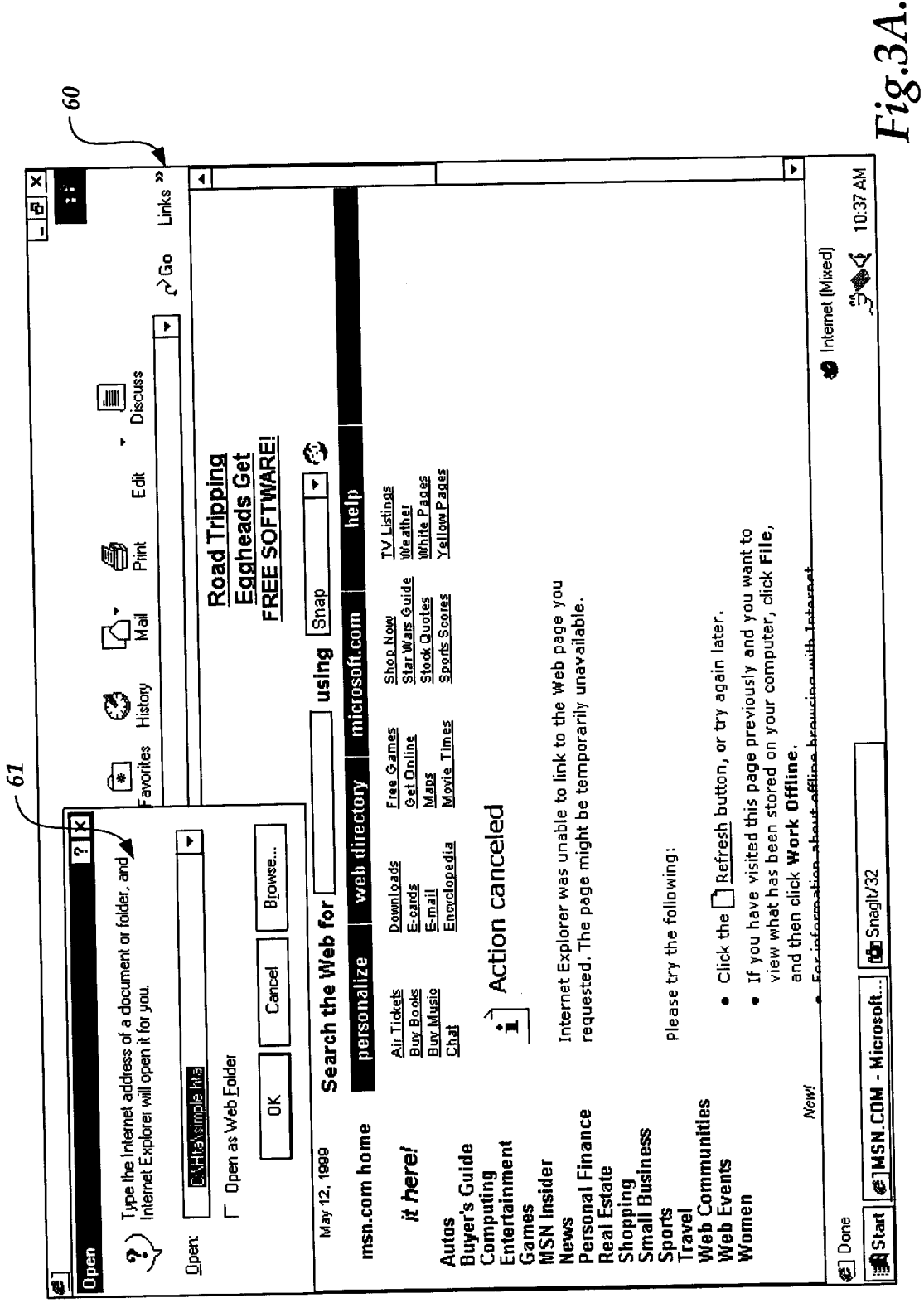
FIGS. 3A–3B are screen shots illustrating the same file shown in FIGS. 2A–2B authored and rendered as an HTML application file in accordance with the present invention.
Figure 3B:
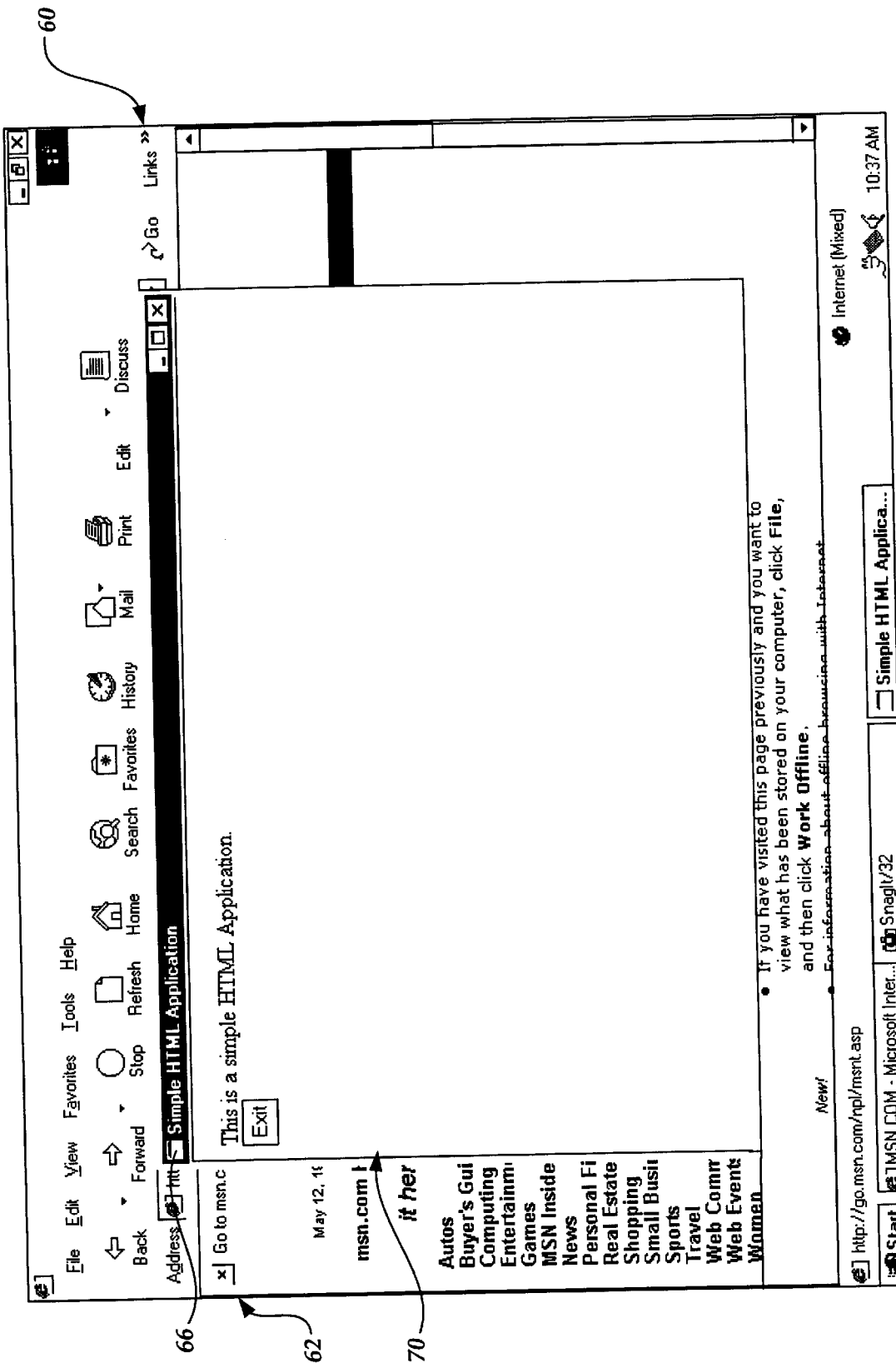

FIGS. 3A–3B illustrate rendering the same HTML used in FIGS. 2A–2B (see Appendix A) as an HTML application file. This was done by saving the same file with an HTML application file extension (i.e., "hta") instead of the standard HTML file extension (i.e., "htm" or "html"). FIG. 3A illustrates an open dialog 61 displayed by the browser 60 in response to a file open request. As shown in FIG. 3B, opening the file, "C:\HTA\simple.hta" does not render the HTML in the browser display window 62, like the standard HTML file shown in FIG. 2B. Rather, the HTML for an HTML application file is rendered in its own window 70, as shown in FIG. 3B. The icon specified in the <HTA:APPLICATION> tag is displayed in the title bar 66. See FIG. 6 for an a summary of the available attributes for an HTML application tag. The default attribute values in FIG. 6 are underlined.

FIGS. 4A–4E and FIGS. 5A–5E illustrate another example of rendering a file as a standard HTML file (FIGS. 4A–4E) and rendering the same file as an HTML application file (FIGS. 5A–5E). The HTML used for FIGS. 4A–4E and FIGS. 5A–5E is included in Appendix B. The example illustrated in FIGS. 4A–4E and 5A–5E is an example of cross-frame access and is included to illustrate the relaxed security restrictions available to HTML application authors. Since it is possible for a browser to simultaneously display unrelated documents in its various windows and frames, certain rules are enforced by browsers to protect data integrity and privacy of information. For most content, only interactions with content from the same domain are allowed. For example, a typical page on http://www.microsoft.com/ can freely script content on any other page on http:H/www.microsoft.com/but cannot script to pages that are located on a different domain. Scripts that attempt to access data to which they do not have access will be blocked with a "permission denied" error. Since they are not bound by the security restrictions of the browser, HTML applications can simultaneously access content from different domains.

Figure 4A:
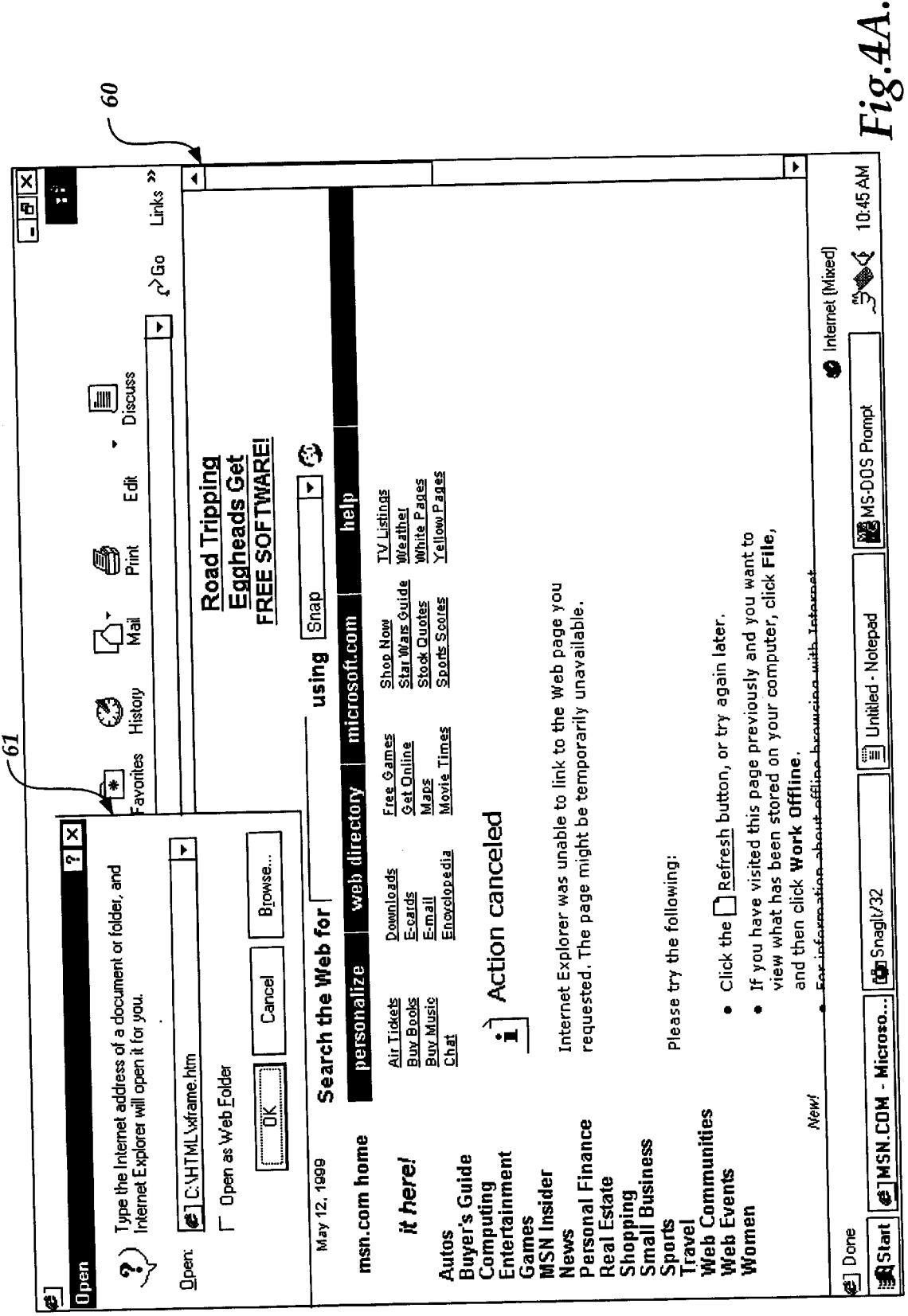
FIGS. 4A–4E are exemplary screen shots illustrating rendering of another standard HTML file.
Figure 4B:
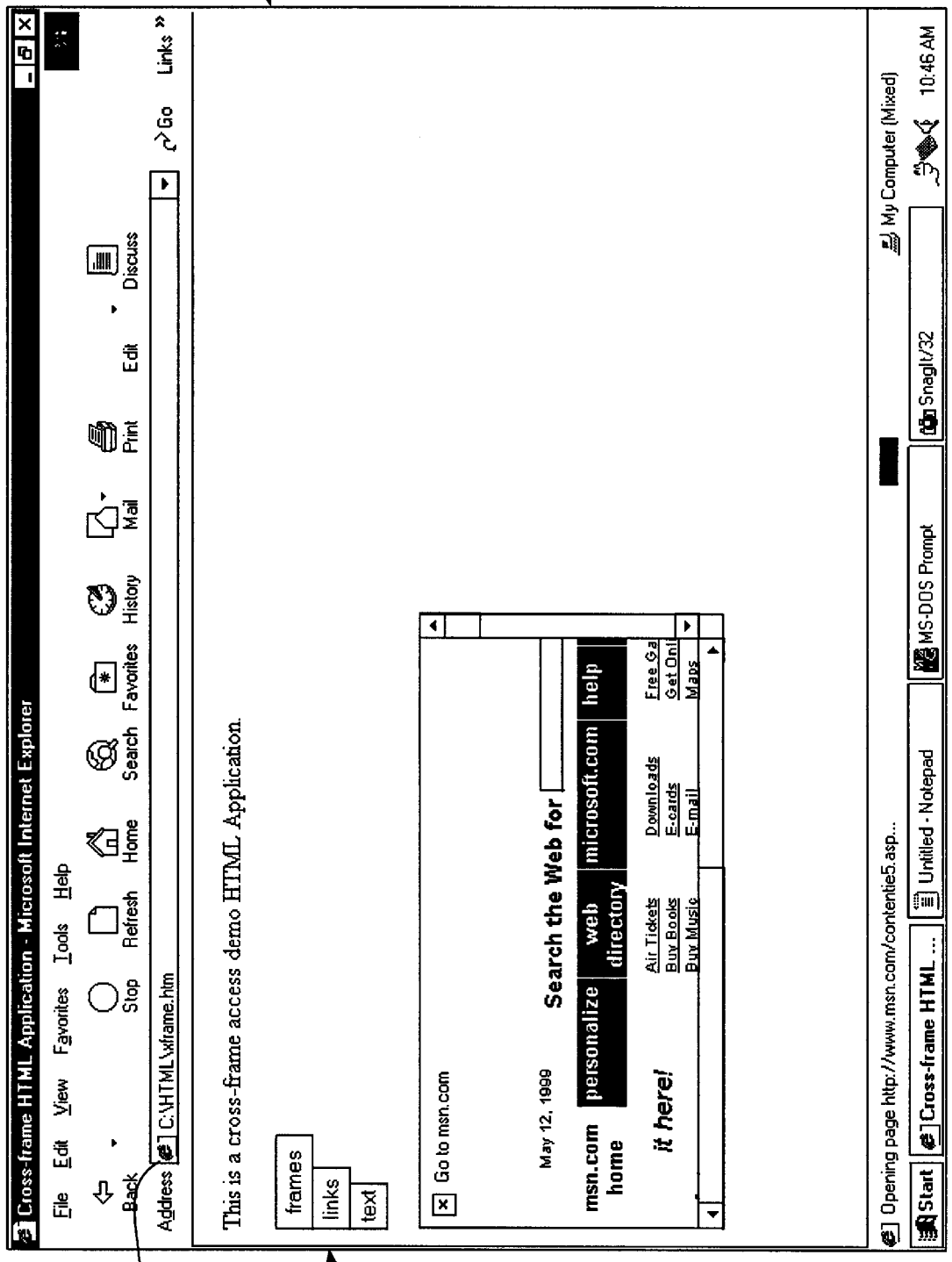
Figure 4C:
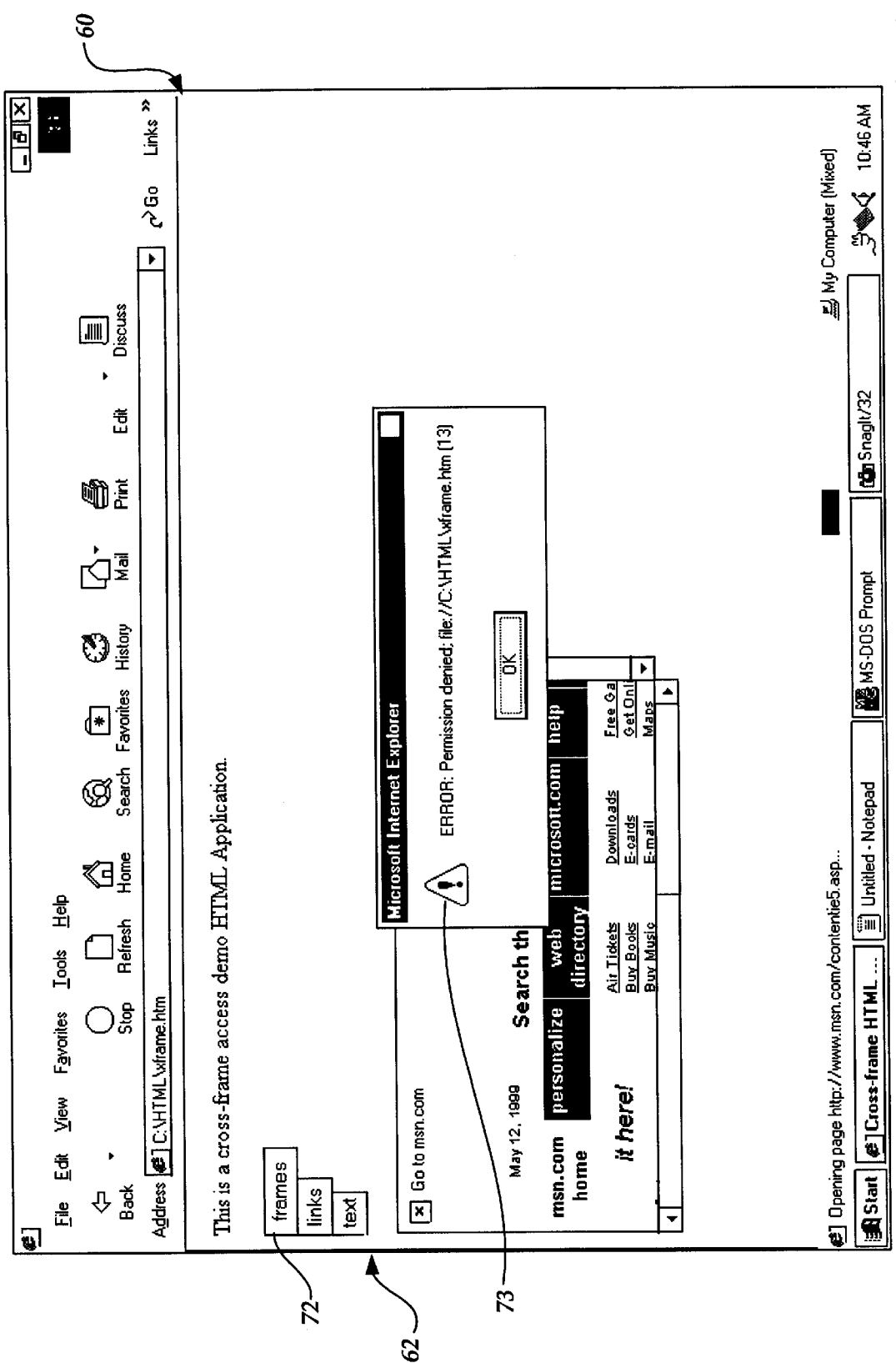
Figure 4D:
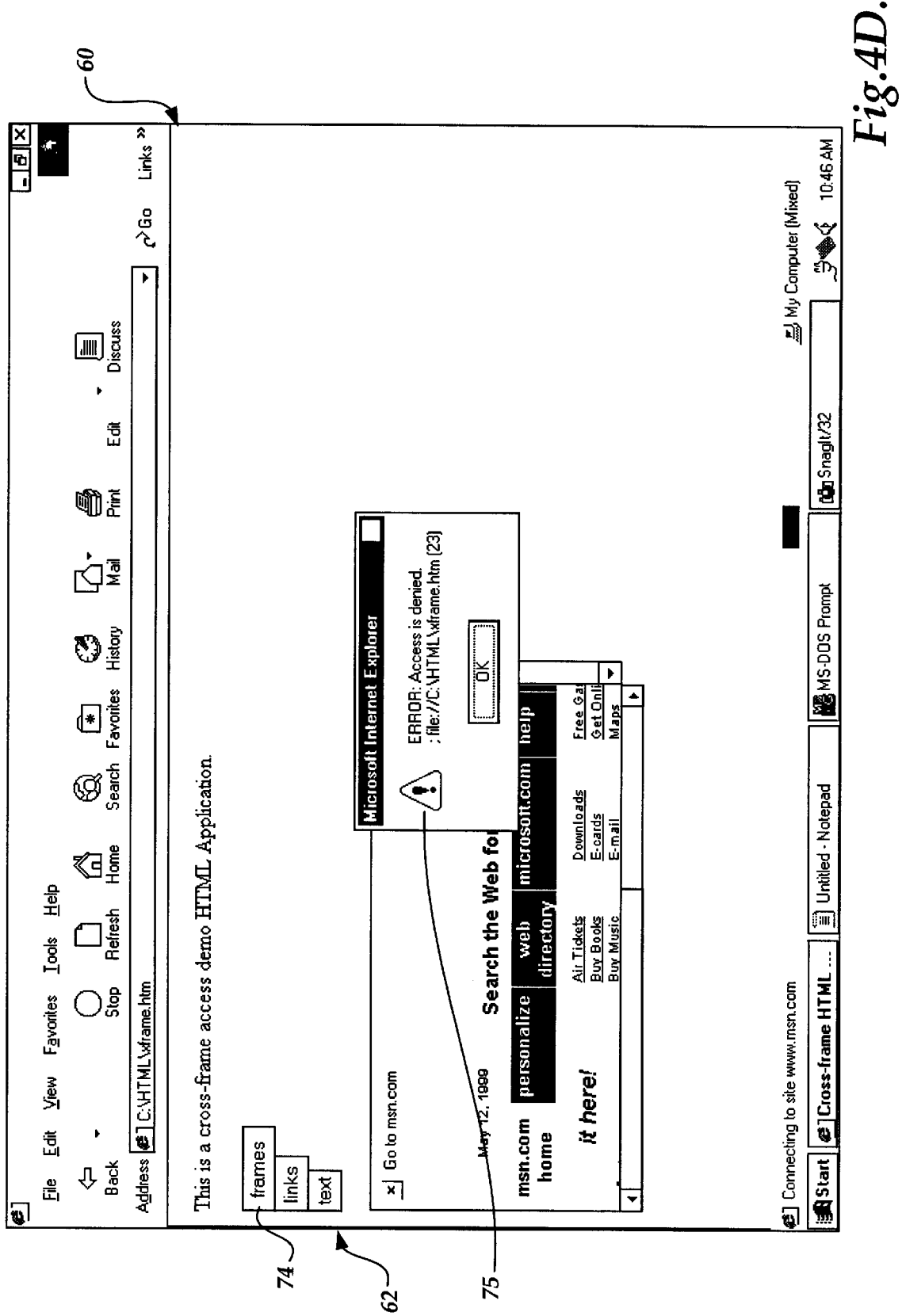
Figure 4E:
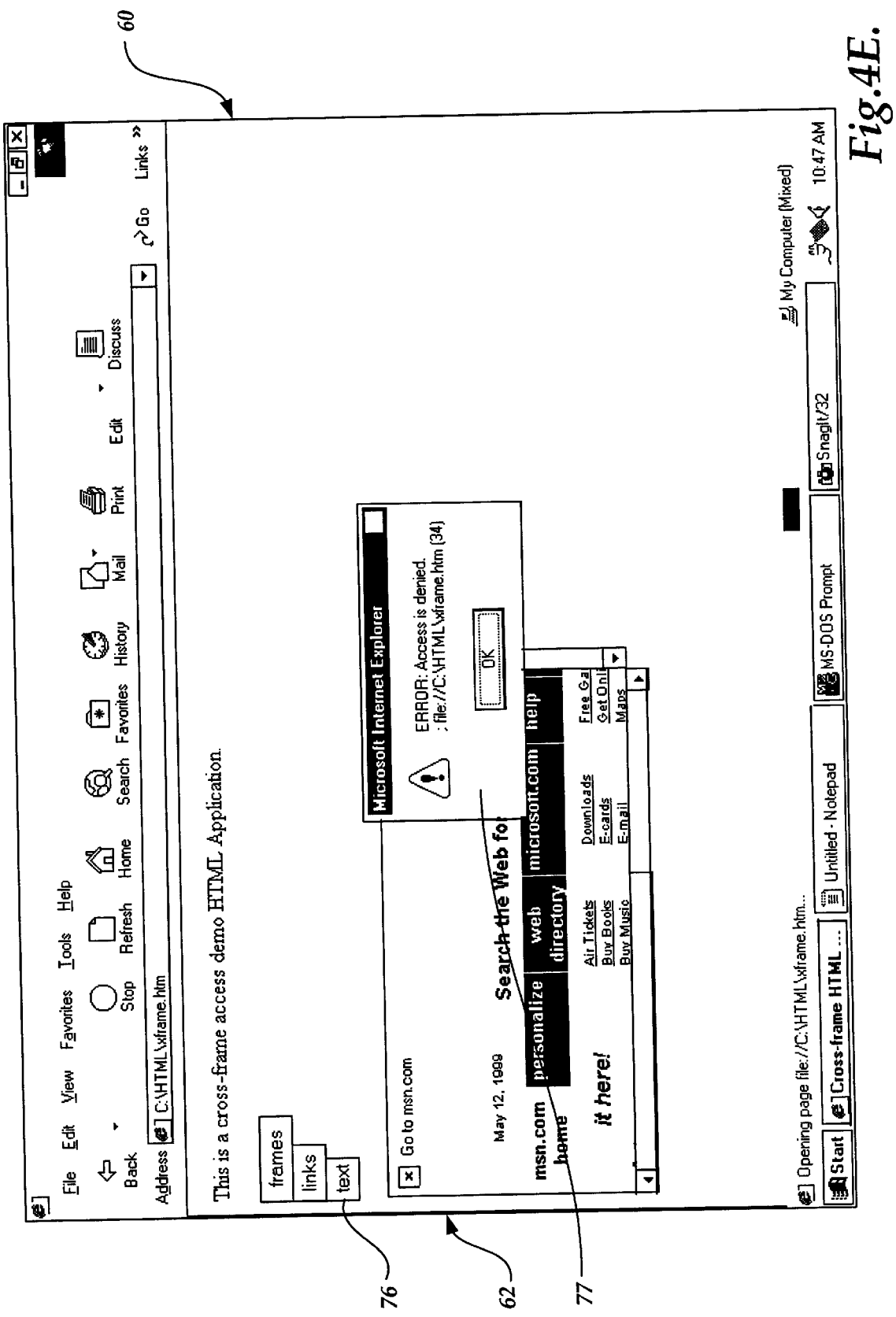

FIG. 4A illustrates a dialog box 61 used to open the file "C:\HTML\xfrarne.htm". FIG. 4B illustrates the HTML rendered in the display window 62 of the browser 60 for the HTML file "C:\HTML\xframe.htm", as indicated in the address line 63. FIG. 4C illustrates the result of selecting the "frames" button 72 displayed in the browser window 62 of the browser 60. Depressing the "frames" button 72 causes an error message 73 to be displayed. Similarly, when the "links" button 74 is pressed, an error message 75 is displayed as shown in FIG. 4D. Likewise, pressing the "text" button 76 causes an error message 77 to be displayed as shown in FIG. 4E.

Figure 5A:
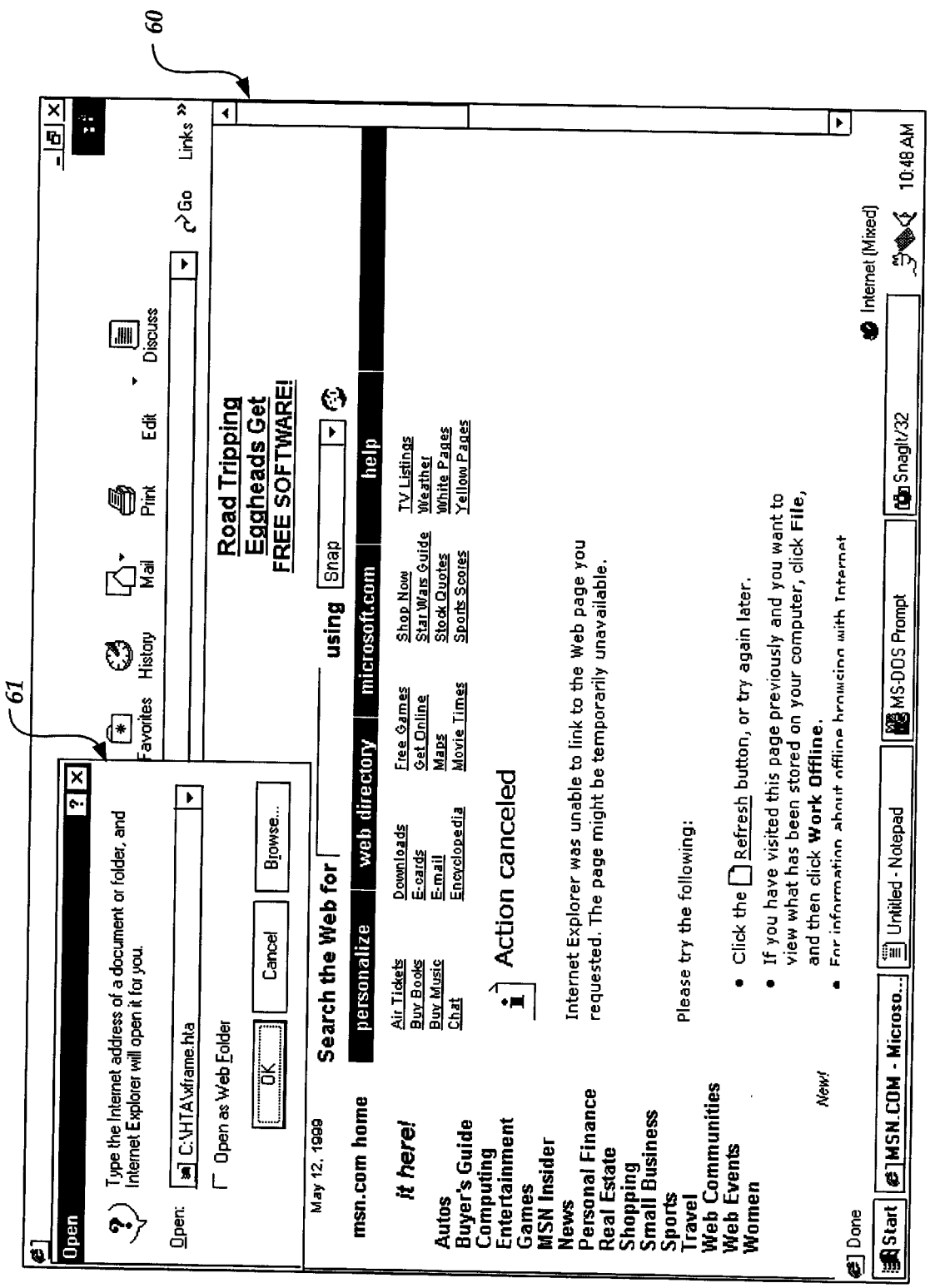
FIGS. 5A–5E are screen shots illustrating the same file shown in FIGS. 4A–4E authored and rendered as an HTML application file in accordance with the present invention.
Figure 5B:
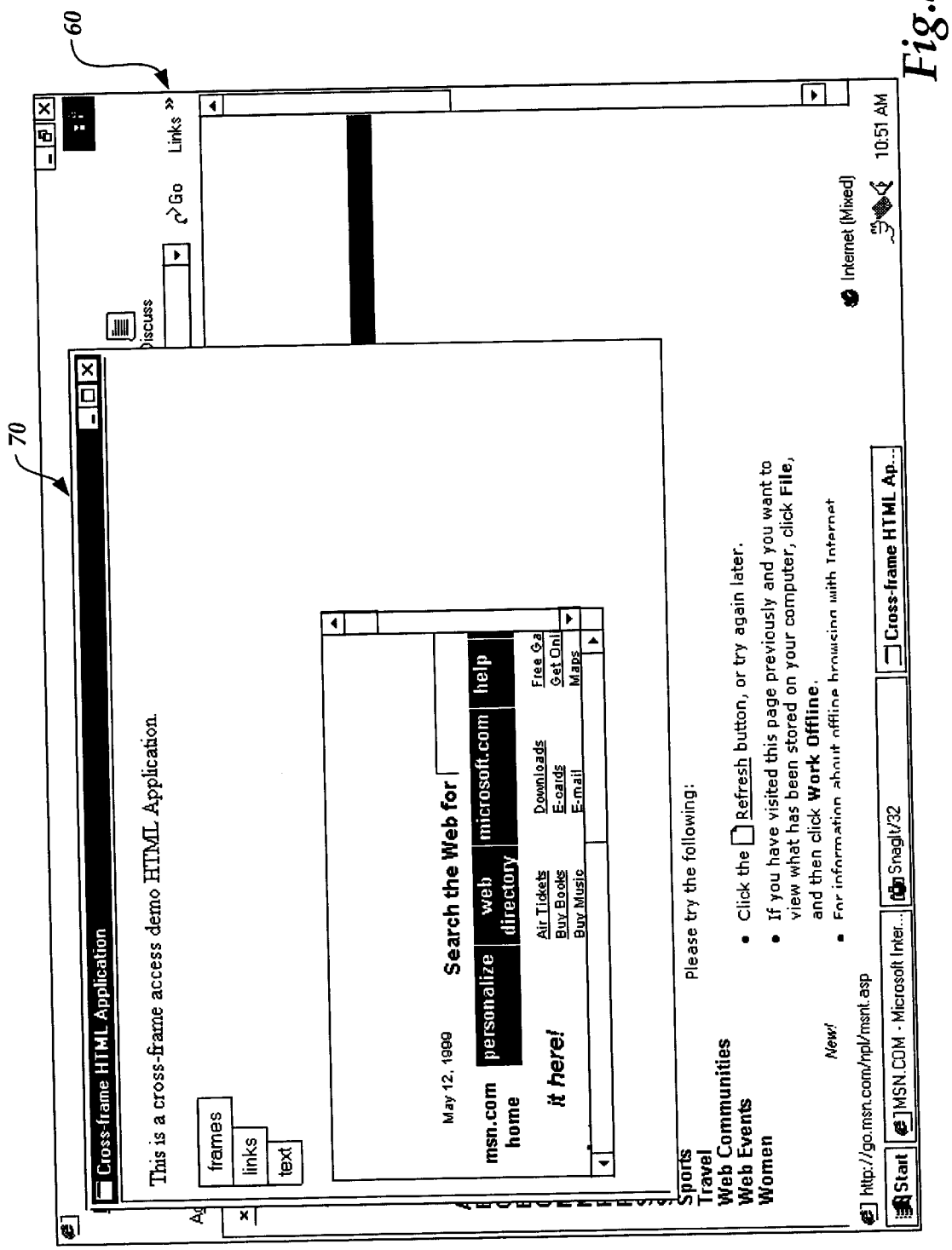
Figure 5C:
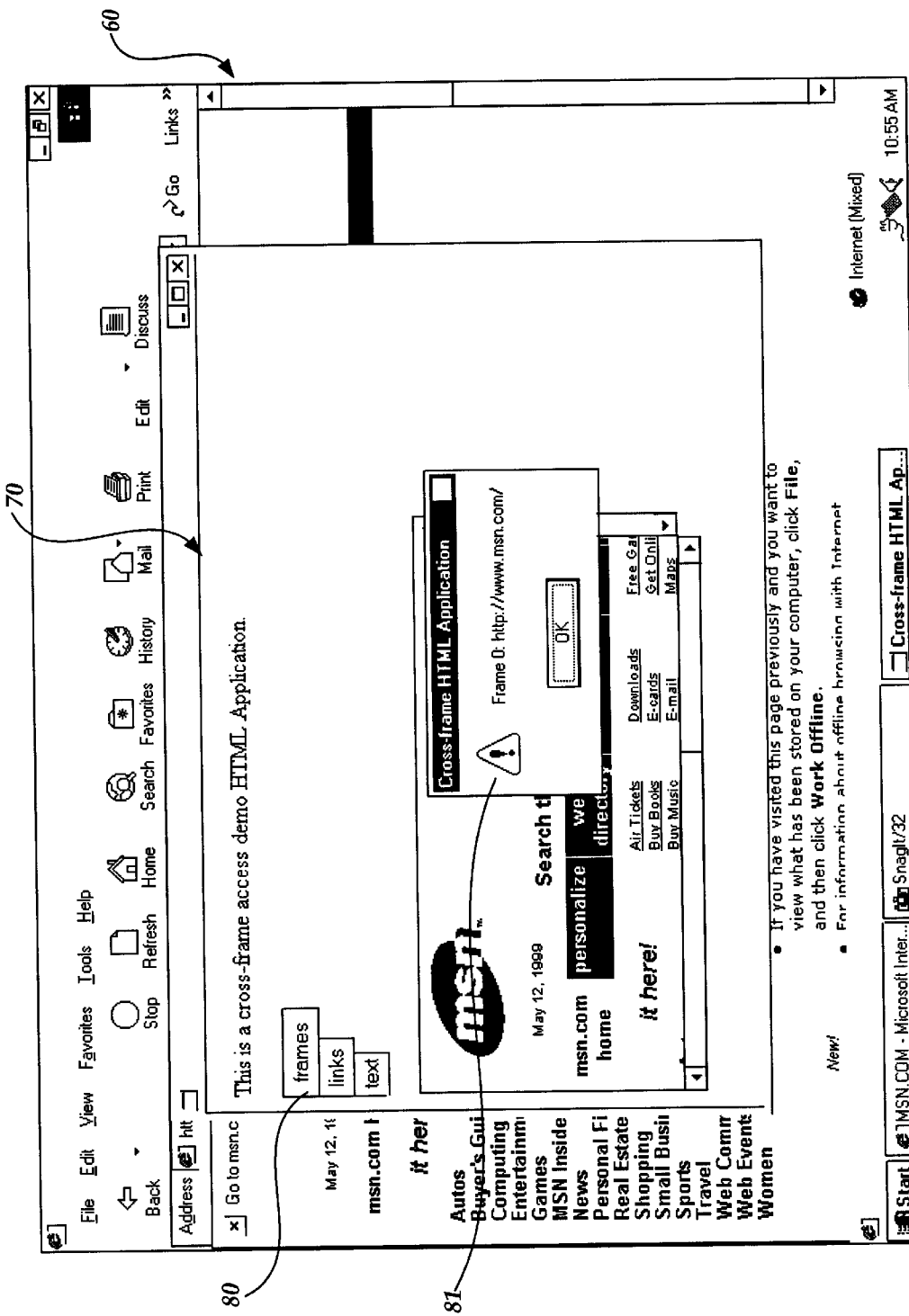
Figure 5D:
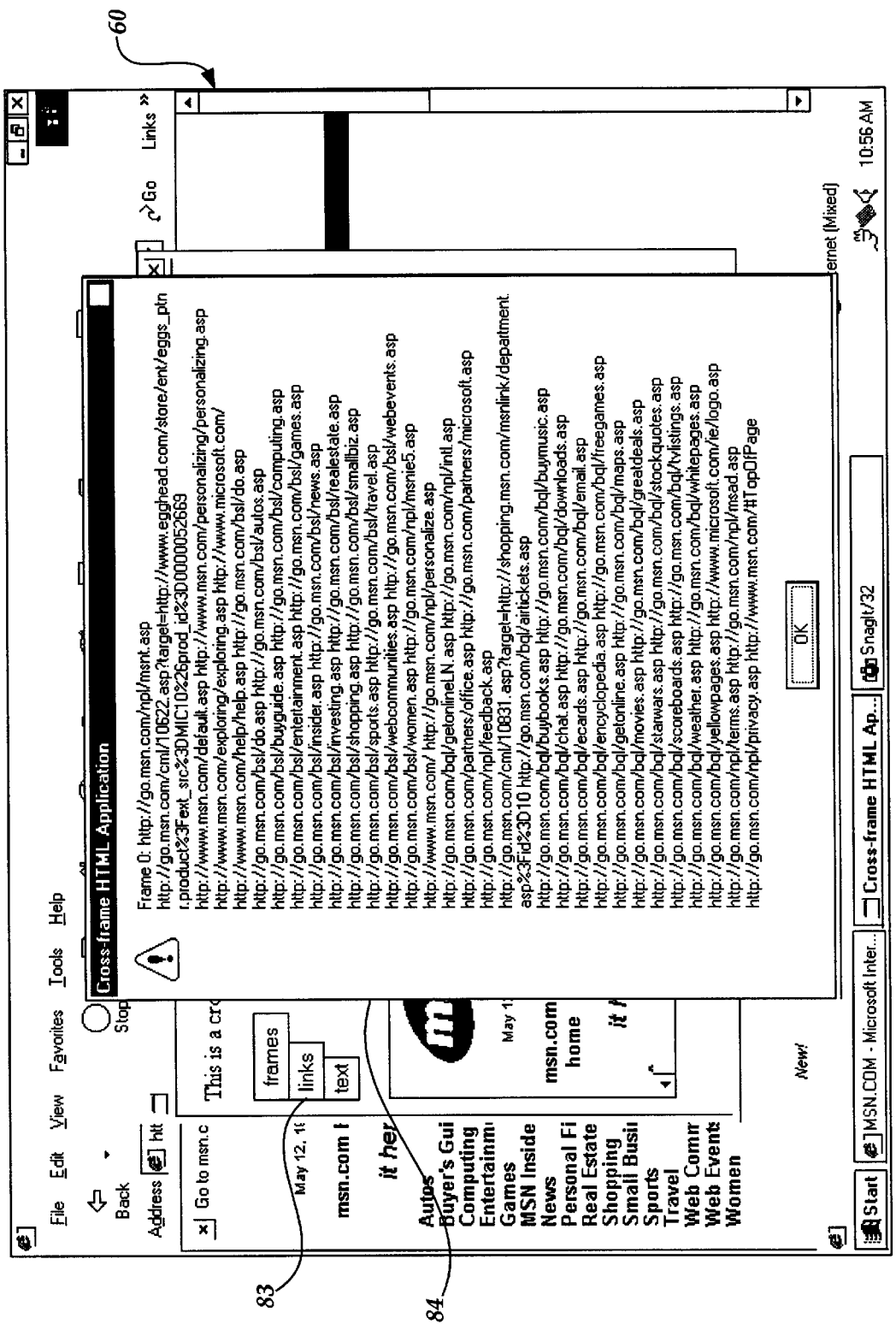
Figure 5E:
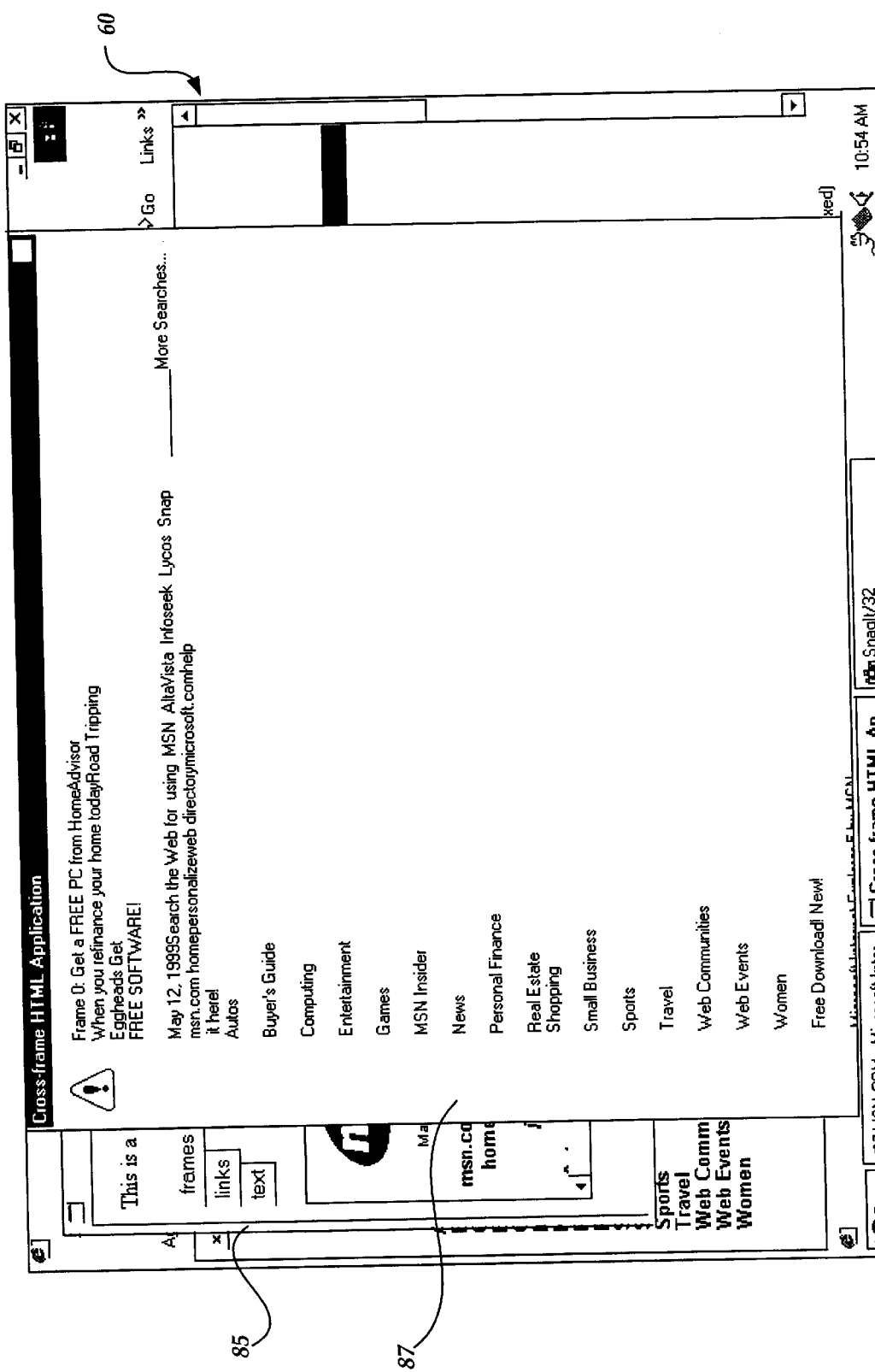

FIGS. 5A–5E illustrate rendering the same HTML used in FIGS. 4A–4E (see Appendix B) as an HTML application file. As with FIGS. 3A–3B, this was done by saving the same file with an HTML application file extension (i.e., "hta") instead of the standard HTML file extension. A browser 60 open dialog 61 is illustrated in FIG. 5A. FIG. 5B illustrates the display after opening the file "C:\HTA\xframe.hta" using the open dialog 61 of FIG. 5A. This causes an HTML application window 70 to be displayed as shown in FIG. 5B. FIGS. 5C–5E illustrate the results of selecting the buttons displayed in the HTML application window 70. FIG. 5C illustrates the window 81 displayed in response to pressing a "frames" button 80. FIG. 5D illustrates the window 84 displayed when the "links" button 83 is selected. FIG. 5E shows the window 87 displayed when the "text" button 85 is selected. FIGS. 4A–4E and 5A–5E illustrate the fact that cross-frame access cannot be performed using standard HTML due to security restrictions. However, cross-frame access is possible using HTML applications because they are not bound by the security restrictions imposed by the browser used to invoke the HTML application.

Figure 7:
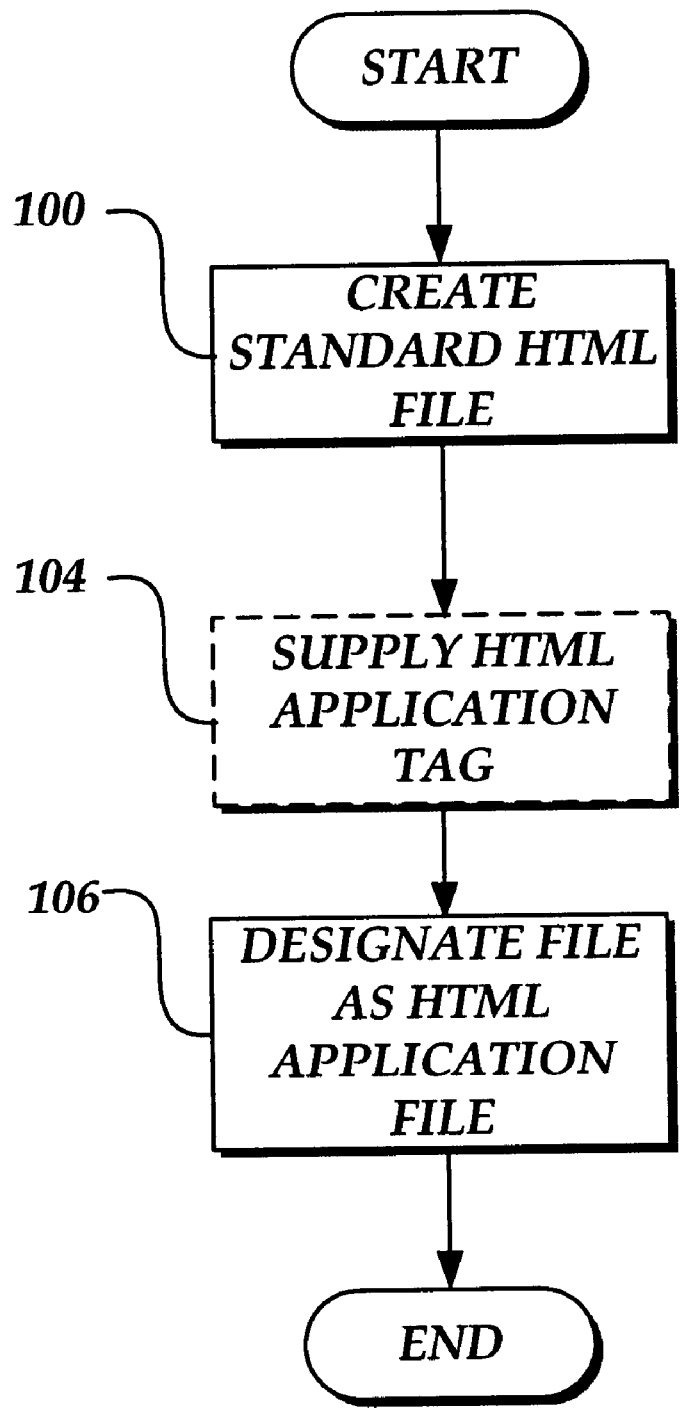
FIG. 7 is a flow diagram illustrating the logic of authoring an HTML application file.

FIG. 7 is a flow diagram illustrating the logic of authoring an HTML application file. The logic moves from a start block to block 100 where a standard HTML file is created. It will be appreciated that this file is created in the same way that any other standard HTML file is created, for example, using a text editor to create the HTML file. It will be appreciated that a Web page and an HTML application are typically a collection of files with images, links, and subframes referenced off the "root" HTML file. HTML applications can also include ActiveX controls. ActiveX controls are reusable software components that incorporate ActiveX technology. These components can be used to add specialized functionality, such as animation or pop-up menus, to Web pages, desktop applications, and software development tools. ActiveX controls can be written in a variety of programming languages, including C, C++, Visual Basic, and Java. ActiveX objects declare themselves as "safe for untrusted caller" or not "safe." Standard HTML can only run "safe" controls, whereas HTML applications can run all ActiveX controls.

The logic of FIG. 7 then moves to block 104 where an HTML application tag can optionally be supplied. While not required, an HTML application tag can be used to modify the appearance and behavior of an HTML application. Preferably, the HTML application tag is of the form <HTA:APPLICATION>, and may include attributes, such as "icon", as illustrated in FIG. 3B and Appendix A. FIG. 6 illustrates an HTML application tag and attributes. The default HTML application attributes are underlined in FIG. 6. Referring to FIG. 7, next, in block 106, the file is designated as an HTML application file. This can be done by naming the "root" file using an HTML application file extension, preferably, "hta" or by setting the MIME (Multipurpose Internet Mail Extension) type to an HTML application MIME type, preferably, "application/hta." Configuring MIME types provides a mapping for file types handled based on the extension of the filename. In other words, a browser, such as Internet Explorer, is configured to recognize files with an "hta" extension as application files. As described below in connection with FIG. 8, preferably, the HTML application author need only perform one of the methods of designating the file as an HTML application file, i.e., using the HTML application file extension or setting the MIME type to an HTML application MIME type. Even though only one of the two options is required, both options can be used, if desired. By designating a file as an HTML application file, the author automatically reaps the benefits of taking advantage of relaxed security standards by not being bound by the security restrictions imposed by the browser, as discussed above. The relaxed security standards provide the HTML application the capability to: read from a remote computer 49; read from a local computer, e.g., read files from a hard disk 39, a floppy disk 29 or an optical disk 31 of the local computer 20; or write to a local computer 20. As an illustrated example, FIGS. 4A–4E show security restrictions imposed by a browser. In the illustrated example, cross frame access is prohibited. In contrast, cross frame access is permitted when the same HTML file is designated to be an HTML application, as illustrated in FIGS. 5A–5E. The logic of FIG. 7 then ends.

Figure 8:
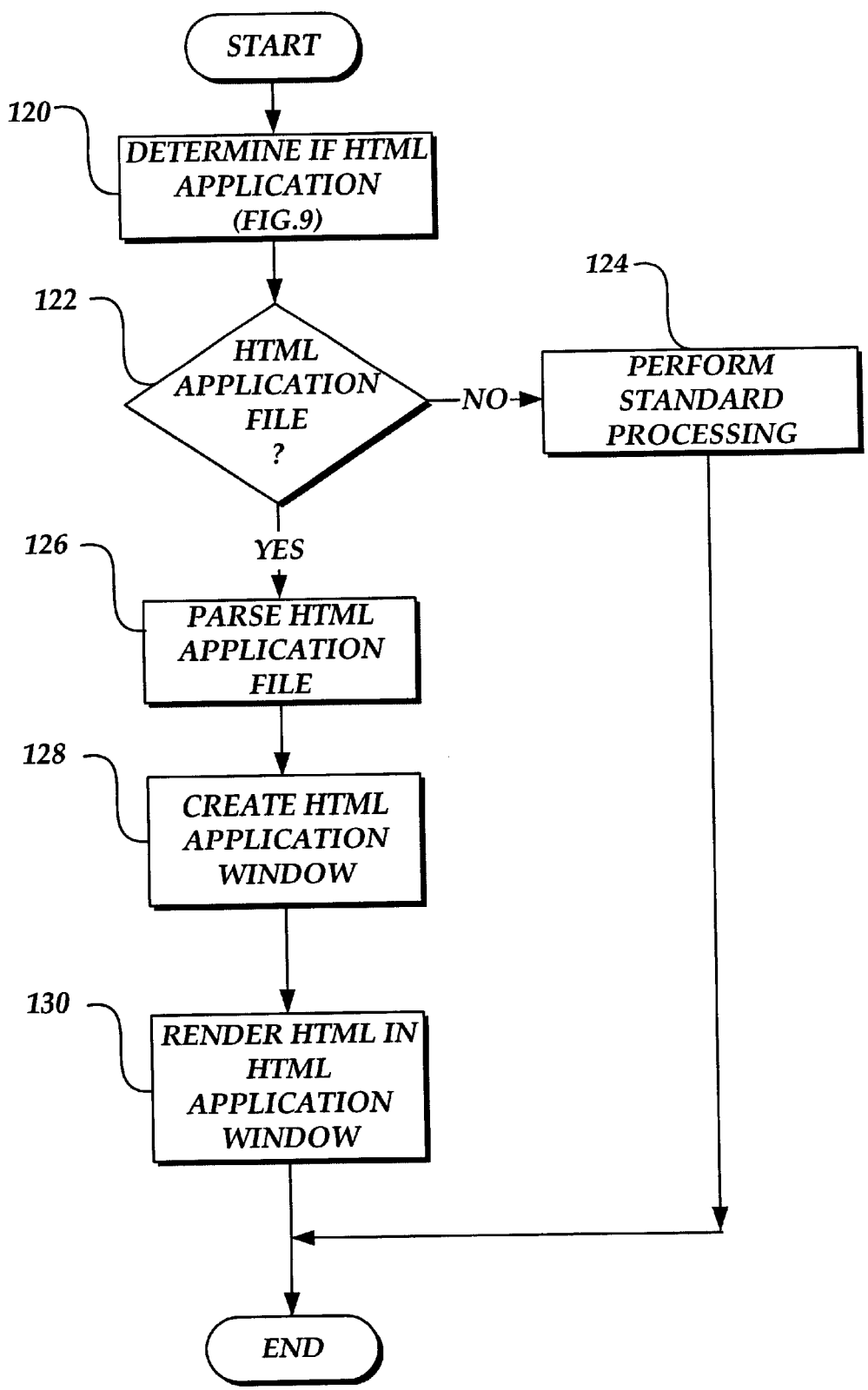
FIG. 8 is a flow diagram illustrating the logic of executing a locally stored HTML application file.

FIG. 8 is a flow diagram illustrating the logic of executing a locally stored HTML application file. This can be accomplished in a variety of ways, for example, by using the "Run" command from the "Start" menu of a Microsoft Windows operating system such as Windows 95, Windows 98, or Windows NT. After requesting execution of a file, the logic moves from a start block to block 120 where a determination is made as to whether the file requested to run is an HTML application file. The logic of making this determination is illustrated in detail in FIG. 9.

Figure 9:
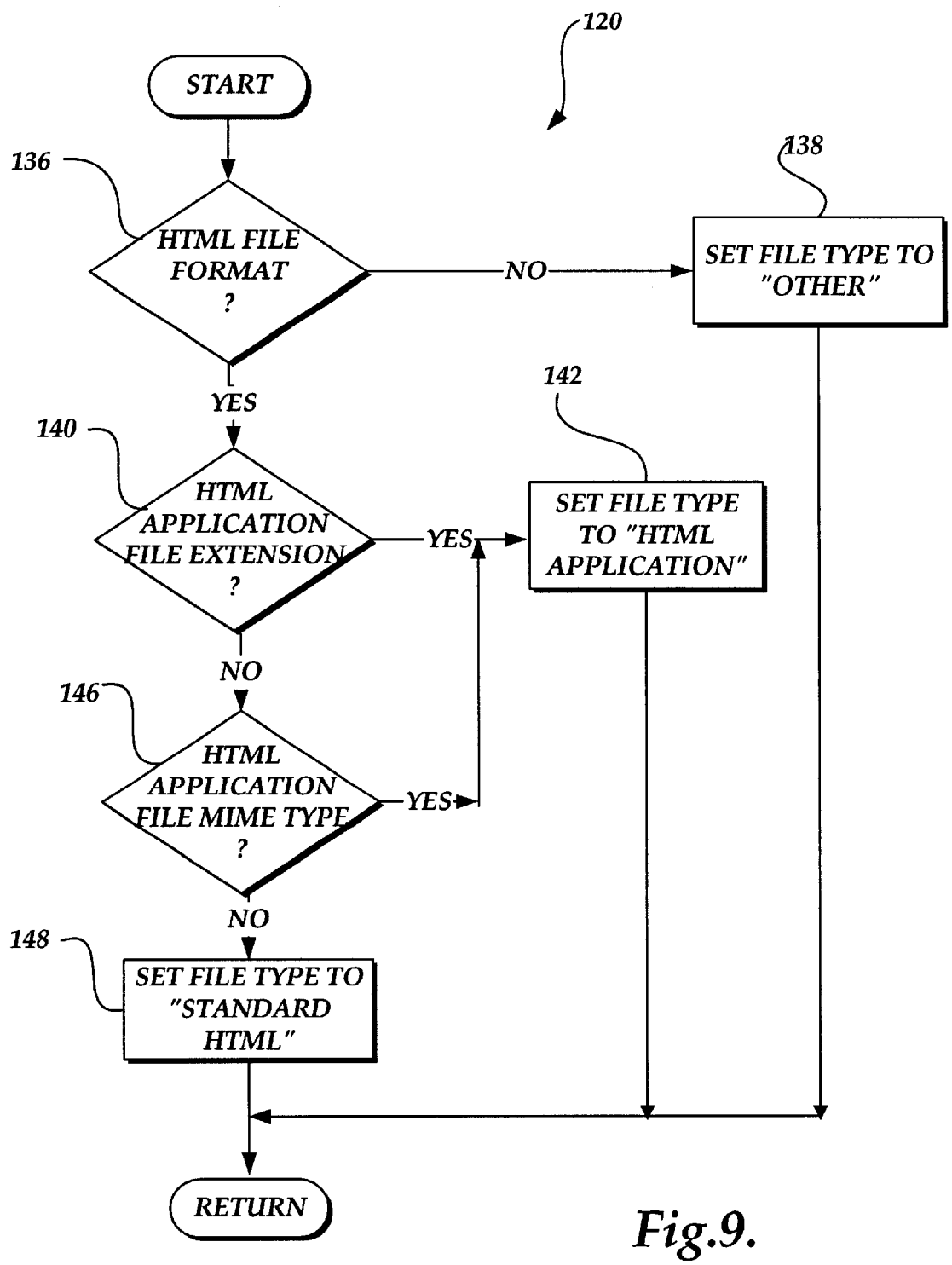
FIG. 9 is a flow diagram illustrating the determination of whether a file is an HTML application file or a standard HTML file.

The logic of FIG. 9 moves from a start block to decision block 136 where a test is made to determine if the file has an HTML file format. This determination is made by looking at the first few hundred bytes of the file. If the file has an HTML file format, it is either a standard XHTML file or an HTML application file. If the file format is not an HTML file format, the logic moves to block 138 where file type is set to "other". The logic of FIG. 9 then ends, and processing returns to the calling process. If, however, the file has an HTML file format, the logic moves from decision block 136 to decision block 140 where a test is made to determine if the file has an HTML application file extension, preferably, "hta". If so, the logic moves to block 142 where the file type is set to "HTML application". If not, the logic moves to decision block 146 where a test is made to determine if the MIME type is an HTML application file MIME type. If so, the logic moves to block 142 where the file type is set to "HTML application". If not, the logic moves to block 148 where the file type is set to "standard HTML". The logic of FIG. 9 then ends and processing returns to the calling process.

Returning to FIG. 8, the logic next moves to decision block 122 where a test is made to determine if the file requested to run was determined to be an HTML application file (in FIG. 9). If not, the logic moves to block 124 where standard processing is performed. For example, if the file type is a standard HTML file type, normal HTML processing is performed. If the file type is "other", the processing for the particular file type is performed. Normal processing (for files other than HTML application files) is not the subject of this application, and therefore will not be discussed in further detail. If it is determined in block 122 that the file is an HTML application file, the logic moves to block 126 where the HTML application file is parsed. In a preferred embodiment using the Internet Explorer, this parsing is accomplished using several processes that communicate with each other and perform various aspects of the processing. This multi-process communication is illustrated in detail in FIG. 12 and described later. Parsing of an HTML application file is different than parsing of a standard HTML file due to the relaxed security restrictions. For example, inline scripts run unrestricted in HTML application files. After the file is parsed, the logic moves to block 128 where an HTML application window is created. An HTML application window is a standard Windows window. It will be appreciated that this window executes outside of the browser, for example, as shown in FIG. 3B. The logic then moves to block 130 where HTML is rendered in the HTML application window. The logic of FIG. 8 then ends.

Figure 10:
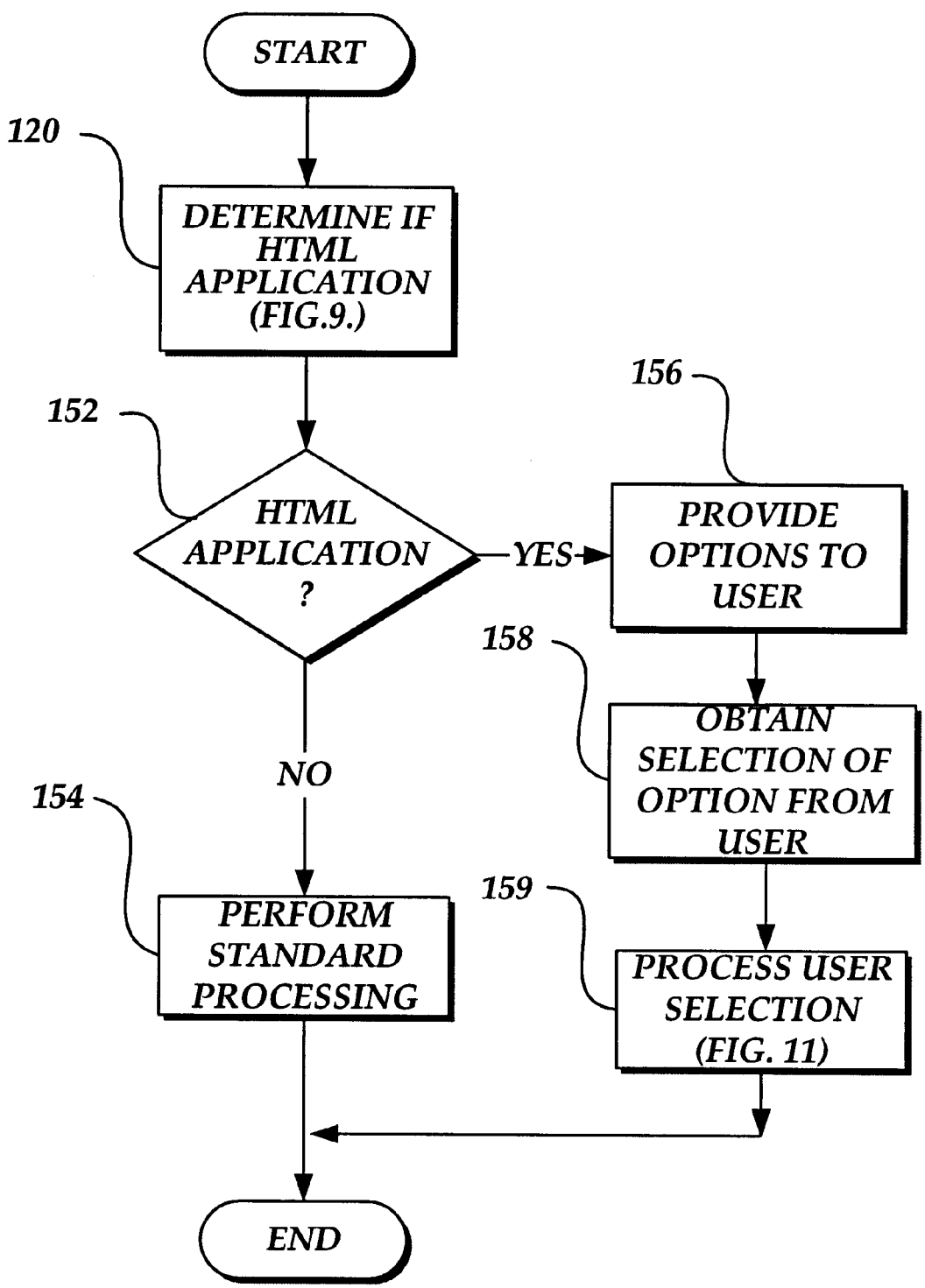
FIG. 10 is a flow diagram illustrating the logic of remotely executing an HTML application file.

FIG. 10 is a flow diagram illustrating the overall logic of executing an HTML application remotely, i.e., by enabling a hyperlink in a browser, such as Microsoft Internet Explorer 5.0. The logic moves from a start block to block 120 where a determination is made as to whether the enabled link references an HTML application file. The logic of determining whether the file is an HTML application file is illustrated in detail in FIG. 9, and discussed above.

The logic then moves to decision block 152 where a test is made to determine if the file is an HTML application file based on the criteria shown and described in FIG. 9. If the file is not an HTML application file, the logic moves to block 154 where standard processing is performed. Since standard processing such as processing standard HTML is known in the art and is not the subject of the present invention, it will not be described in further detail. After performing standard processing, the logic of FIG. 10 ends. If, in decision block 152, it is determined that the file is an HTML application file, the processing is the same as for an executable file, i.e., "exe" file. It will be appreciated that the remainder of the processing of FIG. 10 is preferably performed using the existing "exe" processing of the browser. Next, the logic moves to block 156 where options are provided to a user, preferably via a suitable user interface, for example, a user interface similar to the user interface displayed upon selection of remotely running an executable file, i.e., "exe" file. These options preferably include: (1) download HTML application file; (2) run HTML application; and (3) cancel. Next, the logic moves to block 158 where the option selected by the user is obtained. Next, in block 159, the user selection is processed. Processing a selection is illustrated in detail in FIG. 11 and described next. After the selection has been processed, the logic of FIG. 10 ends.

Figure 11:
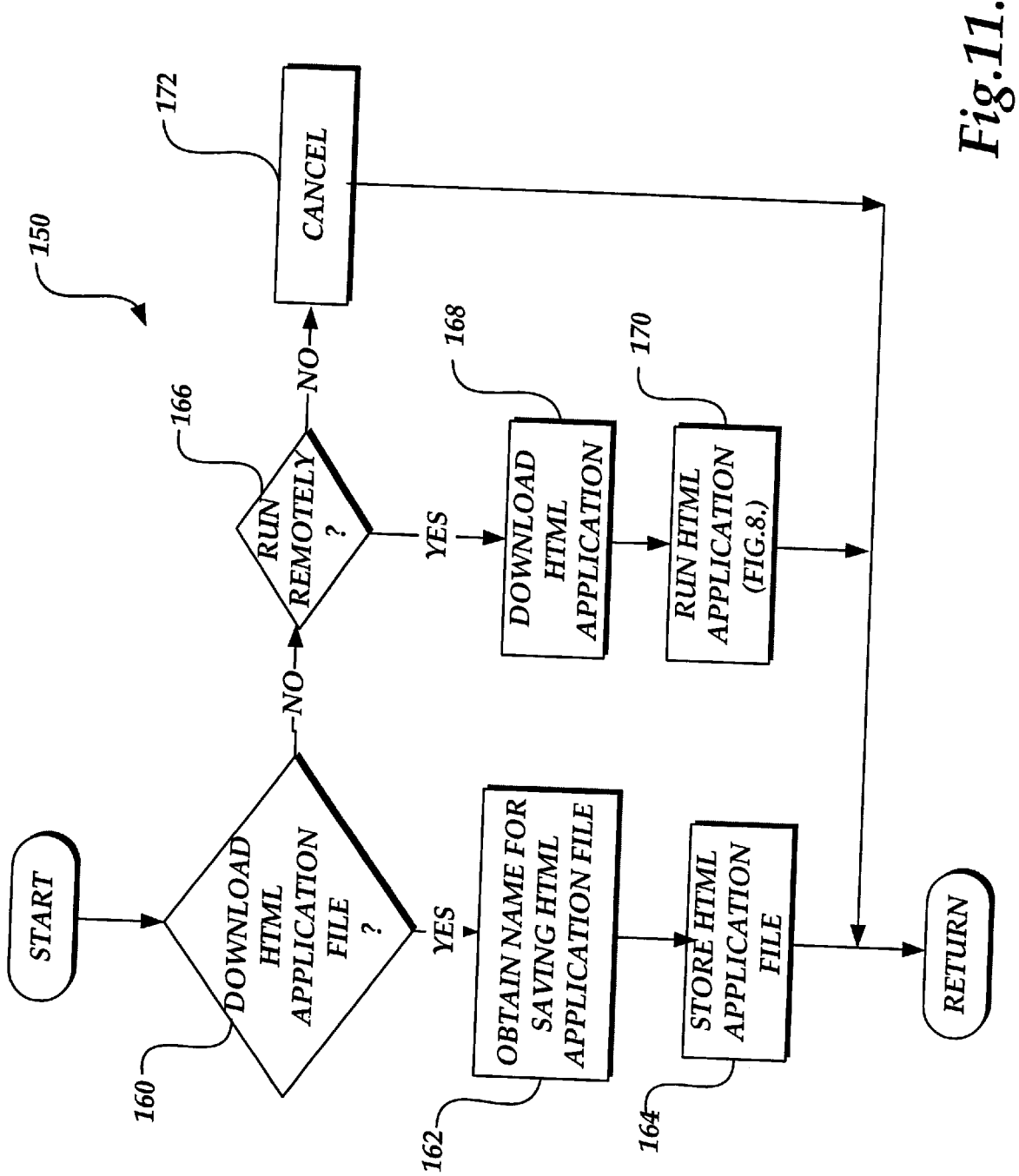
FIG. 11 is a flow diagram illustrating in detail the logic of processing a user selection based on the invocation of a run remote HTML application file.

The logic of FIG. 11 of processing a user selection, moves from a start block to decision block 160 where a test is made to determine if the HTML application file should be downloaded. If so, the logic moves to block 162 where a name is obtained for saving the file. Preferably, this is done via a suitable user interface. Next, in block 164, the HTML application file is downloaded and stored using the name obtained. The logic of FIG. 11 then ends, and processing returns to FIG. 10. If it is determined in decision block 160 that the HTML application file should not be downloaded, the logic moves to decision block 166 where a test is made to determine if the HTML application file should be run remotely. If so, the logic moves to block 168 where the HTML application file is downloaded. Next, the HTML application file is run from cache. The logic of running an HTML application file from cache is the same as running a locally stored HTML application file as illustrated in FIG. 8, and described above. If it is determined in decision block 166 that the HTML application file should not be run remotely, the selection is to cancel in which case the logic moves to block 172, and no further processing is performed. The logic of FIG. 11 then ends, and processing returns to FIG. 10.

FIG. 12 is a message sequence diagram illustrating message traffic used to run an HTML application file remotely in a preferred embodiment of the present invention. The preferred embodiment uses Microsoft Internet Explorer 5.0. FIG. 12 illustrates the communications among a client 200, a browser instance of an HTML rendering component 202, an HTML application handler 204, and an HTML application instance of an HTML rendering component 206. The client represents the user interface of Internet Explorer. When Internet Explorer is run, it instantiates an instance of an HTML rendering component 202. This HTML rendering component parses HTML data and displays it in the browser, i.e., Internet Explorer. The client 200 initiates execution of an HTML application file by selecting a link in the browser, i.e., Internet Explorer that links to an HTML application file.

Upon selection of the link, data 210 is sent to the browser instance of the HTML rendering component 202. This data is the HTML sent based on the hyperlink, i.e., contents of HTML sent by URL (Uniform Resource Locator) referenced by the hyperlink. The browser instance of the HTML rendering component 202 parses the HTML. In doing so, it determines whether the HTML file is a standard HTML file or an HTML application file as described and shown in FIG. 9. If the browser instance of the HTML rendering component 202 determines that the file is a standard HTML file, it processes the HTML and renders it in the browser window. This standard processing is not illustrated here and is not described because it is known in the art and is not the subject of this invention. Assuming the file is an HTML application file, the browser instance of the HTML rendering component 202 sends a notification to an HTML application handler 204. Preferably, this notification is actually an instantiation of the HTML application handler 204. The HTML application handler 204 then sends a user dialog 214 to the client. Preferably, the user dialog gives the user the options of: (1) downloading the file; (2) running the file; and (3) canceling. The user makes a selection, which is then returned to the HTML application handler 204.

FIG. 12 illustrates the message sequencing for the user selection of running the file. Upon receiving a user selection of run 216, the HTML application handler 204 sends a run command to the browser instance of the HTML rendering component 202. The browser instance of the HTML rendering component 202 then forwards a download request 220 to the client 200. In response to the download request 220, the client 200 sends the HTML application file 222 to the browser instance of the HTML rendering component 202. The browser instance of the HTML rendering component 202 forwards the HTML application file 224 to the HTML application handler 204. The HTML application handler 204 then instantiates another instance of the HTML rendering component 206. In one actual embodiment of the invention, the HTML application instance of the HTML rendering component 206 is hosted as a Microsoft HTML Document 5.0 OLE server object, and is loaded via IPersistMoniker-::Load with an URL moniker. The HTML application handler 204 forwards data 226 to the HTML application instance of the HTML rendering component 206. The HTML application instance of the HTML rendering component 206 parses the HTML application file, and sends a notification when parsing is complete 228. When the HTML application handler 204 receives notification that parsing of the HTML is complete, it sends a message to the client to create an HTML application window 230. Preferably, this is a message to a Window's management system, such as Microsoft Windows, using the standard application programming interface of the Windows Manager program. Once the main window has been created, the HTML application handler 204 sends a request to the HTML application instance of the HTML rendering component 206 to render HTML 232. Upon receipt of the request, the HTML application instance of the HTML rendering component 206 renders HTML in the HTML application window 234 via a request to the client 200.

While the preferred embodiment of the invention has been illustrated and described, it will be appreciated that various changes can be made therein without departing from the spirit and scope of the invention as defined by the appended claims.

APPENDIX A

```
<HTML>
<HEAD>
<HTA:APPLICATION ICON=simple.ico>
<TITLE>Simple HTML Application</TITLE>
<SCRIPT>
function nomenu( ) {event.returnValue = false;}
</SCRIPT>
</HEAD>
<BODY oncontextmenu="nomenu( )" scroll=NO>
This is a simple HTML Application.
<BR>
<BUTTON onclick="self.close( )">Exit</BUTTON>
</BODY>
</HTML>
```

APPENDIX B

```
<HTML>
<HEAD>
<HTA:APPLICATION ICON=simple.ico>
<TITLE>Cross-frame HTML Application</TITLE>
<SCRIPT>
function nomenu( ) {event.returnValue = false;}
function showframes( )
{
    for ( i = 0; i < window.parent.frames.length ; i++) {
        var msg = "Frame "+i+":"
        var f = window.parent.frames(i)
        if ( f == window.self) msg += "[self]"
        msg += f.location.href
        alert ( msg )
    }
}
function showlinks( )
{
    for ( i = 0; i < window.parent.frames.length; i++) {
        var msg = "Frame "+i+":"
        var f = window.parent.frames(i)
        if ( f == window.self) msg += "[self]"
        for (j = 0 ; j < f.document.links.length ; j++)
            msg += "" + f.document.links[j]
        alert ( msg )
    }
}
function showtext( )
{
    for ( i = 0 ; i < window.parent.frames.length ; i++) {
        var msg = "Frame "+i+":"
        var f = window.parent.frames(i)
        if ( f == window.self) msg += "[self]"
        msg += f.document.body.innerText
        alert ( msg )
    }
}
function errorhandler(msg,url,line)
{
alert ( "ERROR: "+msg+"; "+url+" ("+line+")" )
return true
}
</script>
</HEAD>
<BODY oncontextmenu="nomenu( )" scroll=NO>
<script>
window.onerror=errorhandler
</script>
This is a cross-frame access demo HTML Application.
<BR>
<form>
<input type=button name=b1 value=frames onclick="showframes( )"><BR>
<input type=button name=b2 value=links onclick="showlinks( )"><BR>
<input type=button name=b3 value=text onclick="showtext( )"><BR>
</form>
<IFRAME SRC="http://www.msn.com" height=200 width=400>
<HR>
<BUTTON onclick="self.close( )">Exit</BUTTON>
</BODY>
</HTML>
```

The embodiments of the invention in which an exclusive property or privilege is claimed are defined as follows:

1. A method for running an HTML application file, the method comprising:
   (a) in response to a request to run a file, determining if the file is an HTML application file by:
   (i) examining the file to determine if the file appears to be an HTML file type;
   (ii) if the file does not appear to be an HTML file type, setting the file type to another file type; and
   (iii) if the file appears to be an HTML file:
   (aa) checking the extension of the file;
   (bb) if the extension of the file is an HTML application file extension, setting the file type to an HTML application file type;

(cc) if the extension of the file is not an HTML application file extension, examining the MIME type; and (dd) if the MIME type is an HTML application MIME type, setting the file type to an HTML application file type; and (b) if the file is an HTML application file:
  (i) displaying an HTML application window;
  (ii) parsing the HTML application file into a plurality of HTML rendering instructions;
  (iii) filling the HTML application window with contents determined by the HTML rendering instructions; and
  (iv) allowing the HTML application file to read from a local computer and write to a local computer when said HTML application file is executed on a local computer.

2. A method for running an HTML application file, the method comprising:

(a) in response to a request to run a file, determining if the file is an HTML file and if the HTML application file should be run wherein determining if the HTML application file should run comprises:
  (i) if the run file request is a request to run a locally stored HTML application file, running the locally stored HTML application file;
  (by (ii) if the run file request is not a request to run a locally stored HTML application file:
    (aa) prompting a user for a run method response;
    (bb) in response to receiving a run method response to store the HTML application file locally:
      (1) prompting the user for a location to store the HTML application file; and
      (2) in response to receiving a location to store the HTML application file, storing the HTML application file at the location specified; and
    (cc) in response to receiving a run method response to run the HTML application file, running the HTML application file; and (b) if the file is an HTML application file:
  (i) displaying an HTML application window;
  (ii) parsing the HTML application file into a plurality of HTML rendering instructions;
  (iii) filling the HTML application window with contents determined by the HTML rendering instructions; and
  (iv) allowing the HTML application file to read from a local computer and write to a local computer when said HTML application file is executed on a local computer.

3. A computer-readable medium having computer-executable instructions for performing the method recited in claim 2.

4. A computer-readable medium having computer-executable instructions for performing the method recited in claims 1.

5. An apparatus for running an HTML application file comprising:

(a) in response to a request to run a file, determining if the file is an HTML application file by:
  (i) examining the file to determine if the file appears to be an HTML file type;
  (ii) if the file does not appear to be an HTML file type, setting the file type to another file type; and
  (iii) if the file appears to be an HTML file:
    (aa) checking the extension of the file;
    (bb) if the extension of the file is an HTML application file extension, setting the file type to an HTML application file type;
    (cc) if the extension of the file is not an HTML application file extension, examining the MIME type; and
    (dd) if the MIME type is an HTML application MIME type, setting the file type to HTML application file type; and (b) if the file is an HTML application file:
  (i) displaying an HTML application window;
  (ii) parsing the HTML application file into a plurality of HTML rendering instructions;
  (iii) filling the HTML application window with contents determined by the HTML rendering instructions; and
  (iv) allowing the HTML application file to read from a local computer and write to a local computer when said HTML application file is executed on a local computer.

6. An apparatus for running an HTML application file, comprising:

(a) in response to a request to run a file, determining if the file is an HTML file and if the HTML application file should be run wherein determining if the HTML application file should be run comprises:
  (i) if the run file request is a request to run a locally stored HTML application file, running the locally stored HTML application file;
  (ii) if the run file request is not a request to run a locally stored HTML application file:
    (aa) prompting a user for a run method response;
    (bb) in response to receiving a run method response to store the HTML application file locally:
      (1) prompting the user for a location to store the HTML application file; and
      (2) in response to receiving a location to store the HTML application file, storing the HTML application file at the location specified; and
    (cc) in response to receiving a run method response to run the HTML application file, running the HTML application file; and (b) if the file is an HTML application file:
  (i) displaying an HTML application window;
  (ii) parsing the HTML application file into a plurality of HTML rendering instructions;
  (iii) filling the HTML application window with contents determined by the HTML rendering instructions; and
  (iv) allowing the HTML application file to read from a local computer and write to a local computer when said HTML application file is executed on a local computer.

7. The apparatus of claim 5, wherein determining if the HTML file should be run further comprises reading data from a local computer.

8. The apparatus of claim 6, wherein if the HTML file should be run further comprises reading data from a remote computer.

9. The apparatus of claim 5, wherein determining if the HTML file should be run further comprises writing data to a local computer.

* * * * *

UNITED STATES PATENT AND TRADEMARK OFFICE
CERTIFICATE OF CORRECTION

PATENT NO. : 6,662,341 B1
DATED : December 9, 2003
INVENTOR(S) : P.R. Cooper et al.

It is certified that error appears in the above-identified patent and that said Letters Patent is hereby corrected as shown below:

Column 1,
Line 23, "dow's application." should read -- dows application. --
Line 37, "present invention" should read -- present invention, --

Column 2,
Line 43, "Although not" should read -- Although it is not --
Line 52, "systems,." should read -- systems, --
Line 67, "structures including" should read -- structures, including --

Column 4,
Line 30, "puter; perform" should read -- puter; and perform --
Line 33, "frame)element." should read -- frame) element. --
Line 50, "ways, for example" should read -- ways, for example, --
Line 56, "field 63" should read -- field 63, --

Column 5,
Line 9, "an a summary" should read -- http:// --
Line 26, "http:H/" should read -- http:// --
Line 27, "www.microsoft.com/but" should read -- www.microsoft.com/ but --

Column 6,
Line 19, "While not" should read -- While it is not --
Line 54, (both instances) "cross frame" should read -- cross-frame --

Column 7,
Line 5, "XHTML" should read -- HTML --
Line 7, "where file type" should read -- where the file type --

Column 8,
Line 53, "Explorer" should read -- Explorer, --

Column 10,
Line 18, "length; i++) {" should read -- length ; i++ ) { --

Column 11,
Line 22, "run wherein" should read -- run, wherein --
Line 27, "(by (ii)" should read -- (ii) --
Line 57, "claims 1." should read -- claim 1. --
Line 58, "file" should read -- file, --
Line 60, "deternining" should read -- determining --

UNITED STATES PATENT AND TRADEMARK OFFICE
CERTIFICATE OF CORRECTION

PATENT NO. : 6,662,341 B1
DATED : December 9, 2003
INVENTOR(S) : P.R. Cooper et al.

It is certified that error appears in the above-identified patent and that said Letters Patent is hereby corrected as shown below:

Column 12,
Line 27, "run wherein" should read -- run, wherein --
Line 59, "wherein if" should read -- wherein determining if --

Signed and Sealed this

Twenty-sixth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,662,341 B1
APPLICATION NO. : 09/315858
DATED : December 9, 2003
INVENTOR(S) : P.R. Cooper et al.

It is certified that error appears in the above-identified patent and that said Letters Patent is hereby corrected as shown below:

Column 1,
Line 23, "dow's application." should read -- dows application. --
Line 37, "present invention" should read -- present invention, --

Column 2,
Line 43, "Although not" should read -- Although it is not --
Line 52, "systems,." should read -- systems, --
Line 67, "structures including" should read -- structures, including --

Column 4,
Line 30, "puter; perform" should read -- puter; and perform --
Line 33, "frame)element." should read -- frame) element. --
Line 50, "ways, for example" should read -- ways, for example, --
Line 56, "field 63" should read -- field 63, --

Column 5,
Line 9, "an a summary" should read -- a summary --
Line 26, "http:H/" should read -- http:// --
Line 27, "www.microsoft.com/but" should read -- www.microsoft.com/ but --
Line 34, "\xfrarne.htm"." should read -- \xframe.htm". --

Column 6,
Line 19, "While not" should read -- While it is not --
Line 54, (both instances) "cross frame" should read -- cross-frame --

Column 7,
Line 5, "XHTML" should read -- HTML --
Line 7, "where file type" should read -- where the file type --

Column 8,
Line 53, "Explorer" should read -- Explorer, --

Column 10,
Line 18, "length; i++) {" should read -- length ; i++ ) { --

Column 11,
Line 22, "run wherein" should read -- run, wherein --
Line 27, "(by (ii)" should read -- (ii) --
Line 57, "claims 1." should read -- claim 1. --
Line 58, "file" should read -- file, --
Line 60, "deternining" should read -- determining --

UNITED STATES PATENT AND TRADEMARK OFFICE
CERTIFICATE OF CORRECTION

PATENT NO. : 6,662,341 B1
APPLICATION NO. : 09/315858
DATED : December 9, 2003
INVENTOR(S) : P.R. Cooper et al.

It is certified that error appears in the above-identified patent and that said Letters Patent is hereby corrected as shown below:

Column 12,
Line 27, "run wherein" should read -- run, wherein --
Line 59, "wherein if" should read -- wherein determining if --

This certificate supersedes Certificate of Correction issued October 26, 2004.

Signed and Sealed this

Eighth Day of August, 2006

JON W. DUDAS
*Director of the United States Patent and Trademark Office*